United States Patent
Watanabe

(10) Patent No.: US 7,602,946 B2
(45) Date of Patent: *Oct. 13, 2009

(54) MOTION DETECTION APPARATUS AND MOTION DETECTION METHOD

(75) Inventor: Seigo Watanabe, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 509 days.

This patent is subject to a terminal disclaimer.

(21) Appl. No.: 11/146,041

(22) Filed: Jun. 7, 2005

(65) Prior Publication Data

US 2006/0078165 A1 Apr. 13, 2006

(30) Foreign Application Priority Data

Sep. 24, 2004 (JP) ............................ P2004-278250
Sep. 27, 2004 (JP) ............................ P2004-279394

(51) Int. Cl.
*G06K 9/00* (2006.01)
(52) U.S. Cl. .................................................. 382/107
(58) Field of Classification Search ................. 382/107
See application file for complete search history.

(56) References Cited

U.S. PATENT DOCUMENTS

| | | | |
|---|---|---|---|
| 5,521,633 A | | 5/1996 | Nakajima et al. |
| 6,246,961 B1 * | | 6/2001 | Sasaki et al. ............... 701/301 |
| 6,343,158 B1 * | | 1/2002 | Shiohara ..................... 382/261 |
| 6,456,730 B1 * | | 9/2002 | Taniguchi .................... 382/107 |
| 6,785,329 B1 * | | 8/2004 | Pan et al. .................... 375/240.08 |
| 7,262,710 B2 * | | 8/2007 | Watanabe et al. ........... 340/903 |
| 2002/0051216 A1 * | | 5/2002 | Hudson et al. ............... 358/302 |
| 2003/0026455 A1 * | | 2/2003 | Watanabe et al. ........... 382/104 |

FOREIGN PATENT DOCUMENTS

| | | | |
|---|---|---|---|
| JP | 6-66820 | | 3/1994 |
| JP | 2000259998 A | * | 9/2000 |
| JP | 2001-209804 | | 8/2001 |

(Continued)

OTHER PUBLICATIONS

Smith, S.M., et al. "Asset-2: Real-Time Motion Segmentation and Shape Tracking." IEEE Transactions on Pattern Analysis and Machine Intelligence, vol. 17, Aug. 1, 1995, pp. 814-820, XP000527675.

(Continued)

*Primary Examiner*—Vikkram Bali
*Assistant Examiner*—Soo Jin Park
(74) *Attorney, Agent, or Firm*—McDermott Will & Emery LLP

(57) ABSTRACT

A motion detection device includes a feature extracting section 2 extracting a feature area of an object from among frame images clipped by an image pickup section 1, a feature standardizing section 3 standardizing a size of a feature area extracted by the feature extracting section 2, a balloting section 4 counting up a ballot value of an image area on a frame image located in a standardized pattern that is standardized by the feature standardizing section 3, and a shift speed detecting section 5 calculating a gradient of a counted-up ballot value and calculating a shift direction, a shift speed and position of a feature area based on the gradient.

22 Claims, 19 Drawing Sheets

FOREIGN PATENT DOCUMENTS

JP 2003-067752 3/2003
JP 2004206320 A * 7/2004

OTHER PUBLICATIONS

Christopher, R.J., et al. "Detecting Corners Using the "Patchy" Hough Transform." Canadian Conference on Electrical and Computer Engineering, vol. 2, Sep. 25, 1994, pp. 576-579, XP010141184.

Nassif, Samer., et al. "Robust Real-time Corner Location Measurement." IEEE Instrumentation and Measurement Technology Conference Sensing, Proceeding, Networking, vol. 1, May 19, 1997, pp. 106-111, XP002356699.

Japanese Office Action, with English translation, issued in Japanese Patent Application No. JP 2004-278250, mailed Nov. 6, 2007.

* cited by examiner

FIG.15
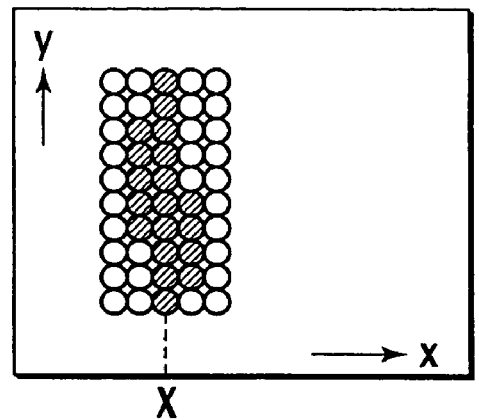
BINARY VALUING (a)
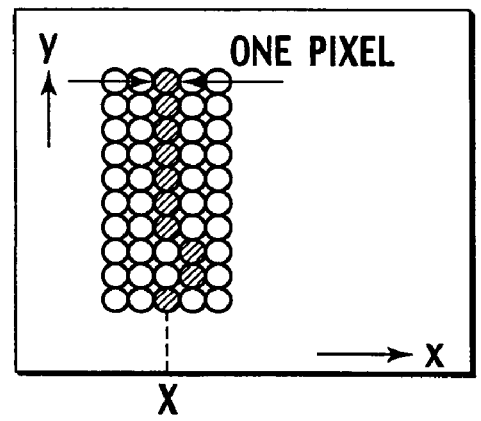
THIN-LINE CONDENSING (b)
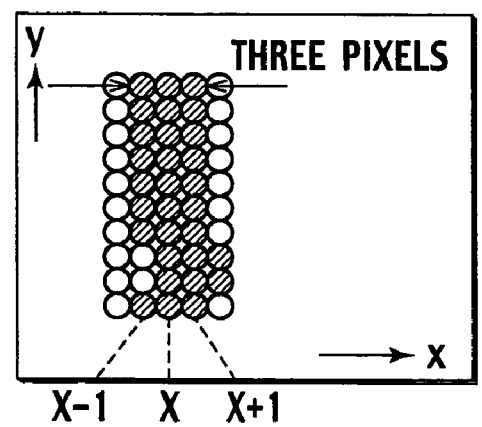
EXPANDING (c)

WITH RELATIVELY HIGH
EDGE SPEED

WITH EDGE OBSERVATION
PERIOD LESS THAN
256 FRAMES

WITH RELATIVELY LOW
EDGE SPEED

WITH EDGE OBSERVATION
PERIOD GREATER THAN
256 FRAMES

| BALLOT TIMING: | AREA 1 EACH FOR 32 FRAMES | AREA 2 EACH FOR 16 FRAMES | AREA 3 EACH FOR 8 FRAMES | AREA 4 EACH FOR 4 FRAMES | AREA 5 EACH FOR 2 FRAMES | AREA 6 EACH FOR 1 FRAMES |
|---|---|---|---|---|---|---|
| BALLOT VALUE: | | 32/16 TIMES | 16/8 TIMES | 8/4 TIMES | 4/2 TIMES | 2/1 TIMES |

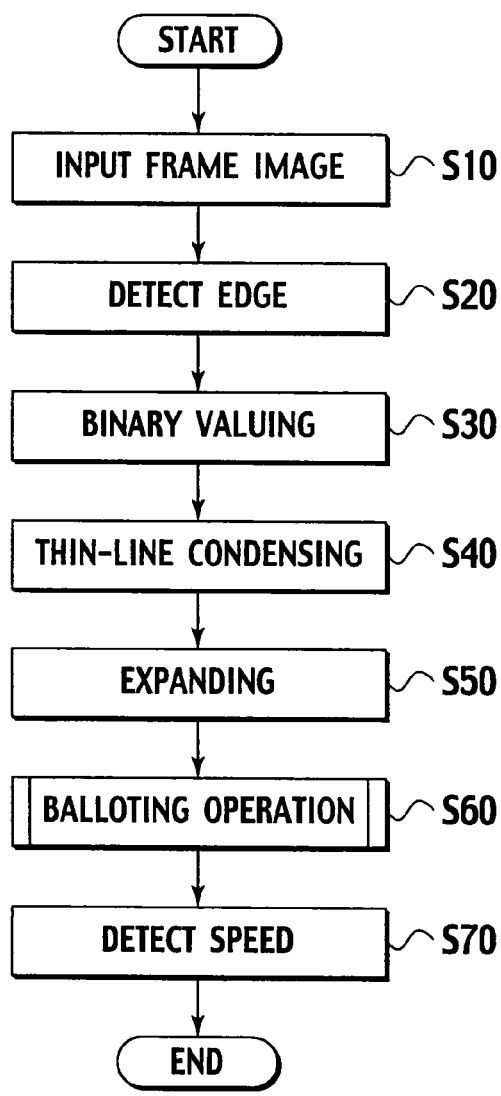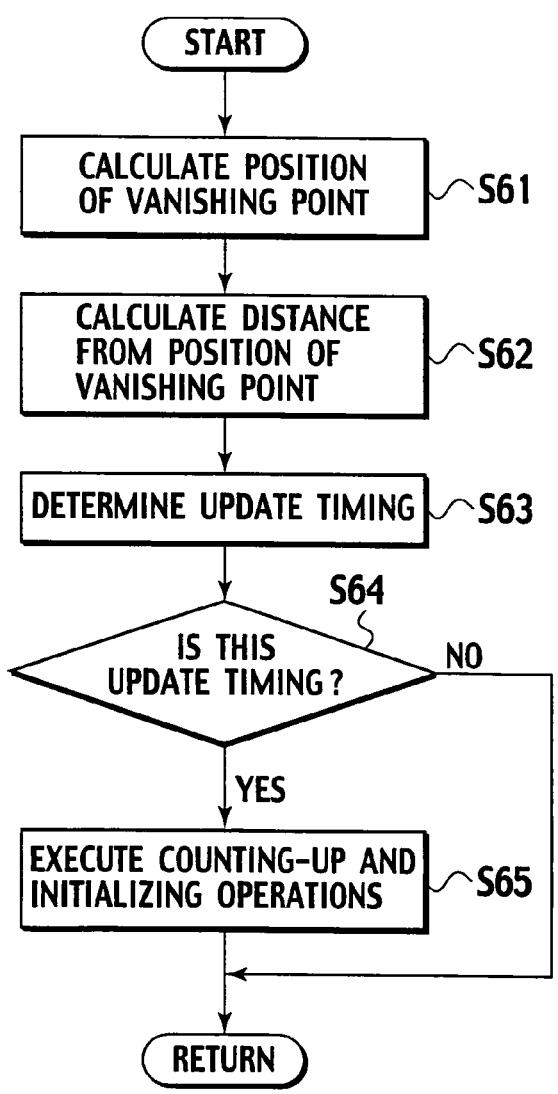

MOTION DETECTION APPARATUS AND MOTION DETECTION METHOD

BACKGROUND OF THE INVENTION

The present invention relates to a motion detection apparatus and motion detection method in which a moving object is detected from among motion images successively picked up for thereby detecting a shift speed, a shift direction and a position of the moving object.

Proposals have recently been made to develop a variety of vehicle vicinity monitoring systems into practical use for recognizing an area surrounding a motor vehicle, such as circumstances of a leading vehicle and a road conditions in front of the own vehicle during running of the vehicle.

Japanese Patent Application Laid-open No. 2003-67752 discloses a vehicle vicinity monitoring apparatus wherein a given image processing is carried on motion images (motion images in time series), successively picked by a camera, to recognize an area surrounding a motor vehicle. One of such image processing methods has heretofore been known as an analyzing technique utilizing an optical flow (a velocity field on an image representing relative motion between an observer of the camera and the moving object).

In general, methods of detecting the optical flow are classified broadly into the following categories:

(a) a correlation method that calculates a flow vector by using specified correlation quantities to determine areas resembling each other in brightness between frame images adjacent to one another in time series;

(b) a gradient method that calculates a flow vector by using a specified relation established between spatial and temporal changes in brightness of the respective images between frames images adjacent to each other in time series.

The former constructs correlation quantities such as a sum of squares of a difference and a sum of absolute of a difference described as:

$$\Sigma\Sigma\{l(x,y,t)-l(x+u,y+v,t+1)\}^2,$$

$$\Sigma\Sigma|l(x,y,t)-l(x+u,y+v,t+1)|$$

where $l(x,y,t)$ represents a brightness on a reference block of a frame image at a certain time t; $l(x+u,y+v,t+1)$ a brightness on a block in which a frame image at the next time t+1, based on the frame image that is split into small areas (called a "block" or "template", which is a pixel group less than sub pixel in general practice).

Then, the set of variables (u,v) that minimizes these correlation quantities is calculated. The calculated value (u,v) is a shift speed of a moving object, that is, a flow vector, between the frame images adjacent in time series. This method is also called a block matching method.

The latter assumes that there is no difference between a brightness $l(x, y, t)$ on a position (x, y) at a certain time t and a brightness $l(x+\delta x, y+\delta y, t+\delta t)$ on a position $(x+\delta x, y+\delta y)$ shifted from the position (x, y) by distances $\delta x, \delta y$ at the next time $t+\delta t$, that is, the following relation:

$$l(x,y,t)=l(x+\delta x, y+\delta y, t+\delta t),$$

is satisfied. If $\delta x, \delta y, \delta t$ are infinitesimal quantities, the optical flow constraint equation as a condition for the total difference of the function l is derived as follows:

$$\delta l/\delta x \cdot dx/dt + \delta l/\delta y \cdot dy/dt + \delta l/\delta t = 0 \Leftrightarrow (\delta l/\delta x, \delta l/\delta y, \delta l/\delta t) \cdot (dx/dt, dy/dt, 1) = 0$$

Then, the flow vector $$\left(\frac{dx}{dt}, \frac{dy}{dt}\right)$$

is calculated by adding a constraint condition to this equation. The constraint condition generally includes a condition under which the flow vector smoothly and spatially varies.

Further, as the other technology for detecting a motion of a moving object, a motion-image processing device is known as disclosed in Japanese Patent Application Laid-open No. 2001-209804. In the motion-image processing device, an image input section retrieves a train of motion images, and a flow detecting section detects a flow vector of each pixel between an appropriate reference image and a current image from among the train of motion images retrieved by the flow detecting section. Then, a flow verifying section verifies a reliability of the flow vector in each pixel. When the reliability is high, a speed determining section measures a shift time for which an amount of shift in pixel for the relevant flow vector reaches a fixed amount, thereby outputting a shift speed of a moving object.

SUMMARY OF THE INVENTION

However, since the former needs a global search that calculates a correlation quantity of the brightness for all blocks of the frame image at time t+1 in terms of a reference block of the frame image at time t, there is a need for enormous quantity of calculations. In other words, in order to calculate the flow vector, the former needs to interpolate the correlation quantity with a higher order curve in a process of the entire search for calculating a position to give an extreme value of the correlation quantity, resulting in a huge amount of calculations.

Further, since the latter is established under the assumption in which the brightness between the adjacent frame images in time series smoothly varies in time, a detection error increases in the absence of this assumption. Additionally, the latter has complicated procedures.

To addressing the above issues, the present invention has an aim to provide a motion detection apparatus and motion detection method wherein by using a procedure with a less amount of data in a relatively simple implementation, a shift speed, a shift direction, and a position of a moving object can be detected from among motion images at a higher speed with a minimal error.

A first aspect of the present invention provides a motion detection apparatus, for detecting a motion of an object, which comprises an image pickup section picking up a motion image and successively clipping a time series of frame images, a feature extracting section extracting a first feature area, representing a feature of the object, from a first frame image among the time series of frame images, a feature area standardizing section standardizing a size of the first feature area to be set as a first standardized feature area, a mask generating section setting an area on the first frame image, which is a complement of the first standardized feature area, as a first masked area, a balloting section resetting a count value on the first masked area and counting up a count value of a first non-masked area that is a complement of the first masked area, and a shift speed calculating section calculating a shift direction and shift speed of the first feature area based on a gradient of a count value accumulated for the time series of frame images.

According to a second aspect of the present invention, there is provided a motion detection method, for detecting a motion of an object, which comprises a image picking-up step for picking up a motion image and successively clipping a time series of frame images, a feature extracting step for extracting a first feature area, representing a feature of the object, from a first frame image among the time series of frame images, a feature area standardizing step for standardizing a size of the first feature area to be set as a first standardized feature area, a mask generating step for setting an area on the first frame image, which is a complement of the first standardized feature area, as a first masked area, a balloting step for resetting a count value on the first masked area and counting up a count value of a first non-masked area that is a complement of the first masked area, and a shift speed calculating step for calculating a shift direction and shift speed of the first feature area based on a gradient of a count value accumulated for the time series of frame images.

BRIEF DESCRIPTION OF THE DRAWINGS

FIG. 15 is a view illustrating a sequence of standardizing operation by the edge-width standardizing section shown in FIG. 13.

FIGS. 25A and 25B are flowcharts illustrating a motion detection method by a motion detection apparatus shown in FIG. 20, with FIG. 25A showing a main flow and FIG. 25B showing a sub flow.

DETAILED DESCRIPTION OF THE PREFERRED EMBODIMENTS

Hereinafter, first to fourth embodiments according to the present invention are described with reference to the accompanying drawings.

A motion detection apparatus of the present invention is installed on a vehicle and operates such that when a feature point or a feature area (hereinafter collectively referred to as the feature area) indicative of a feature of an object is designated from among successively picked-up motion images of an area around the vehicle, motions (a position, a shift direction, a shift speed, and a shift acceleration of the object) of the feature area are detected.

Also, it will be hereinafter supposed that in a two-dimensional domain represented by x- and y-axes, the feature area (one pixel) shifts only in a positive direction on the x-axis. Further, it will be supposed that standardized patterns are formed by three pixels in the direction of the x- and y-axes, respectively, with a central focus on the detected feature area, that is, an area with nine pixels (=three pixels×three pixels). Moreover, it will be supposed that a balloting section 4 counts up one by one. However, these conditions do not necessarily restrict the scope of the present invention.

First Embodiment

Figure 1:
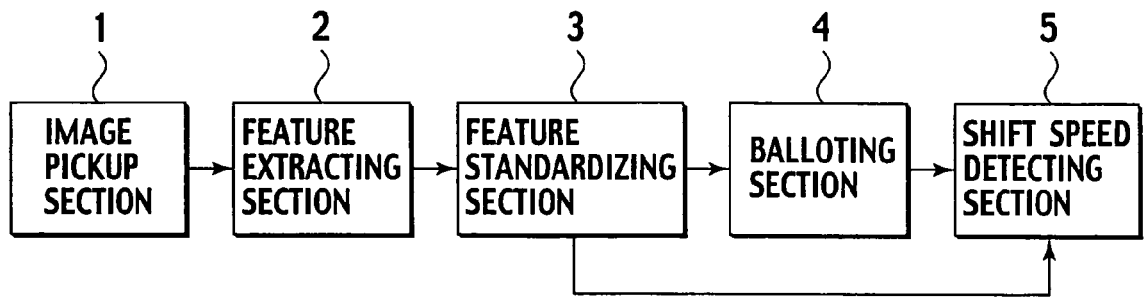
FIG. 1 is a block diagram showing a structure of a motion detection apparatus of a first embodiment according to the present invention.

As shown in FIG. 1, the motion detection apparatus of the presently filed embodiment is comprised of an image pickup section 1, a feature extracting section 2, a feature standardizing section 3, the balloting section 4, and a shift speed detecting section 5.

The image pickup section 1 is constructed of an image pickup element such as a CMOS (Complementary Metal-Oxide Semiconductor) image sensor and a CCD (Charge Coupled Device) and performs a process for clipping the successively picked-up motion images into frame images each for a fixed interval. In this moment, the frame images are clipped at a frame rate adequately higher than a shift speed of an object to be detected.

The feature extracting section 2 is inputted with the frame images, including the relevant object, from the image pickup section 1 and performs a given image processing (which will be described below in detail) on the relevant frame images for thereby extracting a feature area representing a feature of the relevant object.

The feature standardizing section 3 selects a representative point on the feature area extracted from the feature extracting section 2 and operates to form a given pattern, based on the selected representative point, by which a size of the above-described feature is standardized. That is, the feature standardizing section 3 forms a standardized pattern, in which a size of the feature area is standardized, on an area involving the feature area in the frame image. This allows the feature standardizing section 3 to standardize the feature area, detected by the feature extracting section 2, in a predetermined size.

The balloting section 4 executes a process for counting up a ballot value (count value) of memory addresses corresponding to pixel areas (non-masked areas) on the frame image, whose standardized pattern formed by the feature standardizing section 3 is detected, and executes a process (balloting operation) for resetting the count value of a memory address of an image area (masked area) whose standardized pattern is not detected. By so doing, the balloting section 4 stores information about how many number of frames needed for the standardized pattern of the frame image, subject to the current image processing, to be successively detected on the same pixel areas of the respective frame images in a subsequent stage.

The shift speed detecting section 5 calculates a gradient of the ballot value associated with the shift direction of the feature area based on the ballot value stored in the balloting section 4 and, depending on the gradient of the calculated ballot value, further calculates the shift speed of the feature area extracted by the feature extracting section 2.

Figure 2:
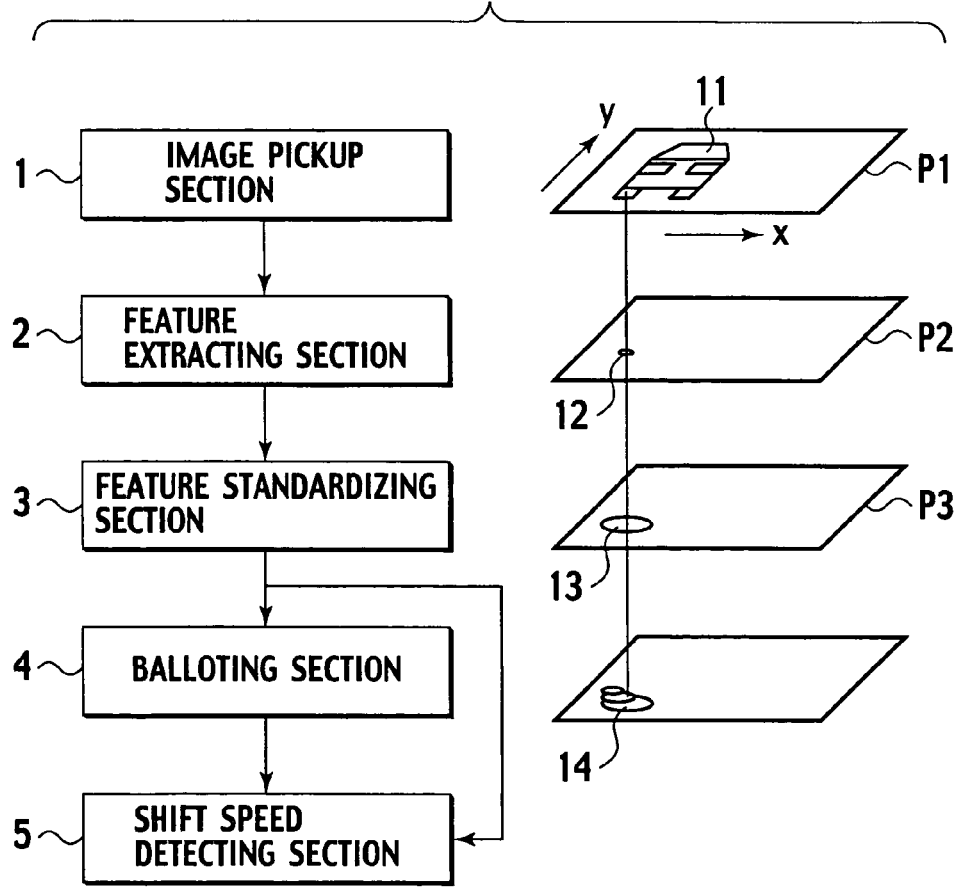
FIG. 2 is a block diagram illustrating a motion of the motion detection apparatus shown in FIG. 1.

With the motion detection apparatus with such a structure, as shown in FIG. 2, the image pickup section 1 initially retrieves an input image P1 involving the other vehicle 11 serving as an object. Next, the feature extracting section 2 prepares a feature image P2 with a feature area of the other vehicle 11 extracted from the input image P1. Then, the feature standardizing section 3 forms a standardized pattern 13 by which a size of the relevant feature area 12 is standardized. When this takes place, the feature standardizing section 3 forms the standardized pattern 13 on an area involving the feature area 12 on the frame image. Then, the balloting section 4 counts the number of times the standardized patterns are detected on the same pixel area within the respective frame images, which are successive in time series, when the above-described operations are sequentially executed by the image pickup section 1, the feature extracting section 2 and the feature standardizing section 3 for thereby providing a counted value as a ballot value 14.

Now, a feature extracting process and a feature standardizing process of the motion detection apparatus mentioned above are described in detail.

First, in the feature area extracting process, the feature extracting section 2 is preferred to creatively use a detection filter depending on the feature of the object in a way described below.

(1) Case in which Edge Filters are Used.

When adopting edge information as the feature of the object, the feature extracting section 2 preferably employs edge detection filters to extract an edge (a contour of the object), forming a portion whose brightness rapidly changes on the frame image, as a feature area. As such edge detection filters, a Sobel filter, serving as a primary differing filter, and other filters (such as a Prewitt filter, a horizontal- or vertical-direction primary space differentiating filter, a secondary space differentiating filter and a non-linear differing filter) may be employed. With the use of these edge detection filters, the feature extracting section 2 prepares an edge image composed of a pixel edge, recognized as an edge, and a pixel edge, which is not recognized as the edge, upon which a feature area (edge width) is extracted.

Figure 3:
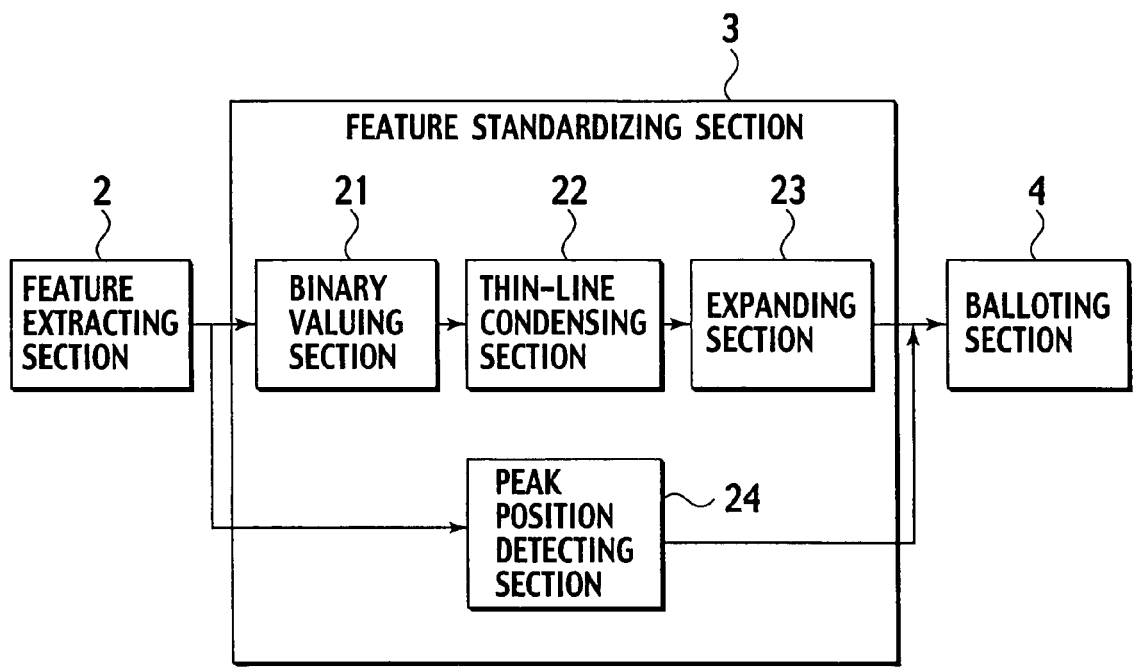
FIG. 3 is a block diagram showing a structure in a case where a feature standardizing section shown in FIG. 1 employs an edge detection filter.

As shown in FIG. 3, the feature standardizing section 3 is comprised of a binary valuing section 21, a thin-line condensing section 22, an expanding section 23 and a peak position detecting section 24. The feature standardizing section 3 with such a structure executes a process (standardizing process) for standardizing a size of an edge width forming the feature area.

First, with the feature standardizing section 3, upon retrieving the edge image delivered from the feature extracting section 2, the binary valuing section 21 converts the edge image to a binary valued image with "0" and "1" (upon binary valuing operation). Subsequently, the feature standardizing section 3 causes the thin-line condensing section 22 to repeatedly execute a thin-line condensing operation on the edge, whose value, subsequent to binary valuing operation executed by the thin-line condensing section 22, takes a value of "1" (active), until the edge width reaches a given pixel number upon which all the detected edge widths are unified to a given pixel number (such as one pixel). Then, the feature standardizing section 3 allows the expanding section 3 to expand the unified edge width (one pixel) to a given pixel number (such as three pixels) depending on needs.

Upon executing the binary valuing process, the thin-line condensing process and the expanding process, the edge image (feature area), extracted in the feature extracting section 2, is converted to a standardized edge image (standardized pattern) whose edge width is standardized in the given pixel number (three pixels).

Also, in standardizing the edge width, the feature standardizing section 3 may be configured such that the peak position detecting section 24 detects the position of a peak of an edge of the edge image, inputted from the feature extracting section 2, for generating the binary valued image whose edge peak position is allocated to have a width with the given pixel number whereby the edge width is standardized.

In such a way, upon completion of the standardizing process executed by the binary valuing section 21, the thin-line condensing section 22 and the expanding section 23, the feature standardizing section 3 standardizes the size of the feature area to deliver positional information of the image area within the frame image, in which the relevant standardized feature area (standardized pattern) is located, to the balloting section 4.

(2) Case in which a Corner Edge Detection Filter is Used.

When adopting corner edge information as a feature of an object, the feature extracting section 2 may preferably use corner edge detection filters for extracting corner portions (corner edges), at which the relevant edges loop back, from among edges of the object as a feature area.

Figure 4:
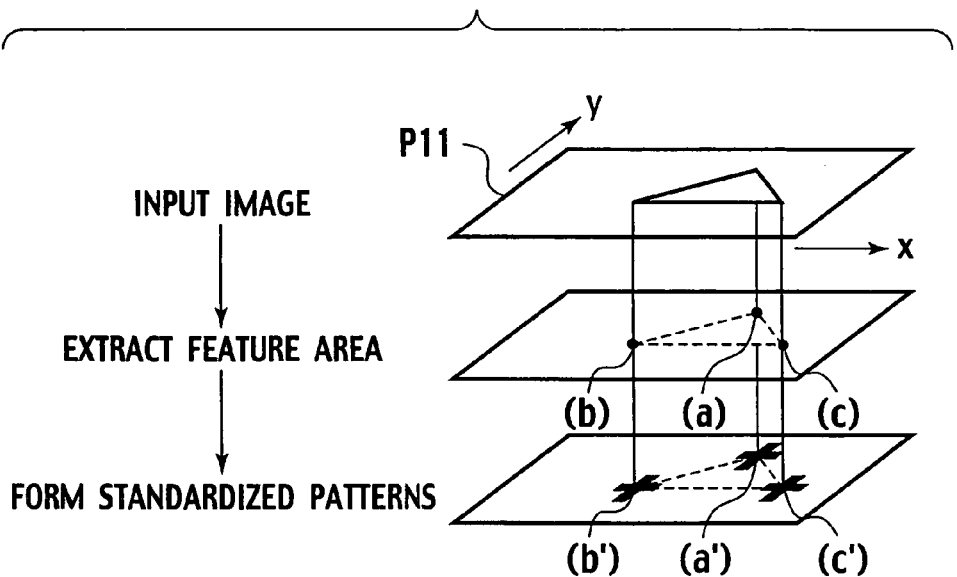
FIG. 4 is a view showing a basic procedure of operation in a case where the feature standardizing section shown in FIG. 1 employs the edge detection filter.

As such corner edge detection filters, a SUSAN operator may be possibly employed. By using the SUSAN operator, the feature extracting section 2 detects a pixel, which has a dense brightness closer to a brightness of a focused pixel, from among the pixels contained in the given pixel area centered at the focused pixel for thereby detecting the corner edges of the object depending on a proportion of the detected pixel occupied in the relevant given pixel area. By so doing, as shown in FIG. 4, the feature extracting section 2 detects the corner edges (a), (b) and (c) of the object as the feature area of the input image P11.

The feature standardizing section 3 executes the process (standardizing process) for standardizing the sizes of the corner edges (a), (b) and (c) forming the feature area. When this takes place, the feature standardizing section 3 generates standardized patterns (a'), (b') and (c') with the same size on pixel areas, respectively, at which the corner edges (a), (b) and (c), detected by the feature extracting section 2, are located. Thus, the feature standardizing section 3 standardize the sizes of the feature areas for delivering positional information of the pixel areas within the frame image, in which the standardized feature areas (standardized pattern) are located, to the balloting section 4.

(3) Case in which a Feature Vector Calculation Filter is Used.

When using a feature vector calculation filter for the feature extracting section 2, the feature extracting section 2 executes the calculation, using a high-order local autocorrelation function, for generating a feature vector indicative of a feature of the object based on the input image. Upon extracting the feature of the object based on the high-order local autocorrelation function, it becomes possible to extract a feature invariable in terms of the (parallel) shift of the object while achieving reduction in the number of dimensions of the feature vector. Examples of the features of the object may include edge information, brightness information and pattern information.

Then, the feature standardizing section 3 forms a standardized pattern for the relevant feature vector based on the size of the pixel area within the frame image associated with a position in which the feature vector is detected. When this takes place, the feature standardizing section 3 executes the same operations as those of the case using the above-described edge detection filters and those of the other case using the corner edge detection filters.

Figure 5:
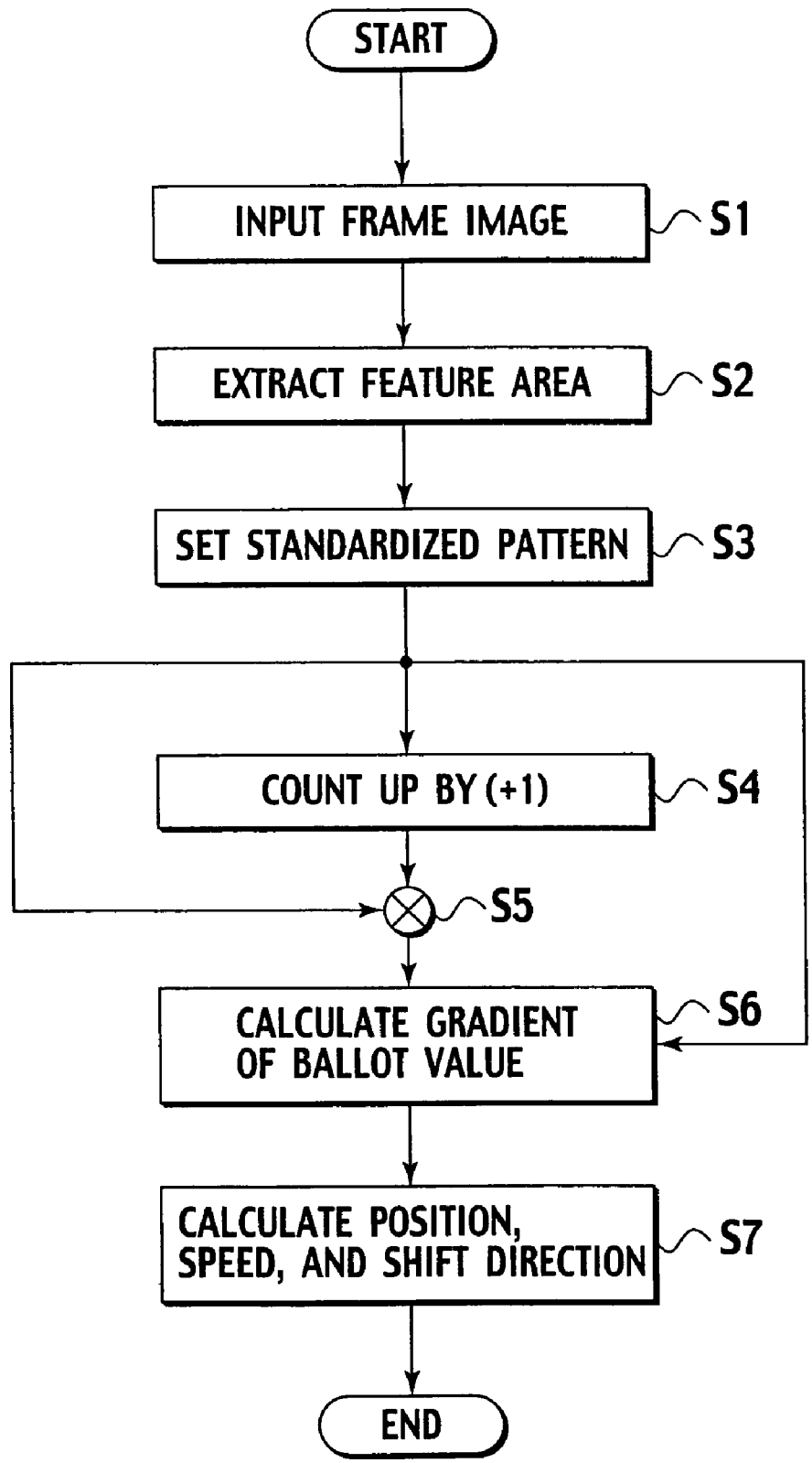
FIG. 5 is a flowchart illustrating a basic procedure of motion detecting operation by the motion detection apparatus shown in FIG. 5.

Next, the operation of the motion detection apparatus, set forth above, for acquiring a shift speed and direction of the object are described with reference to FIGS. 5 to 7.

Figure 6:
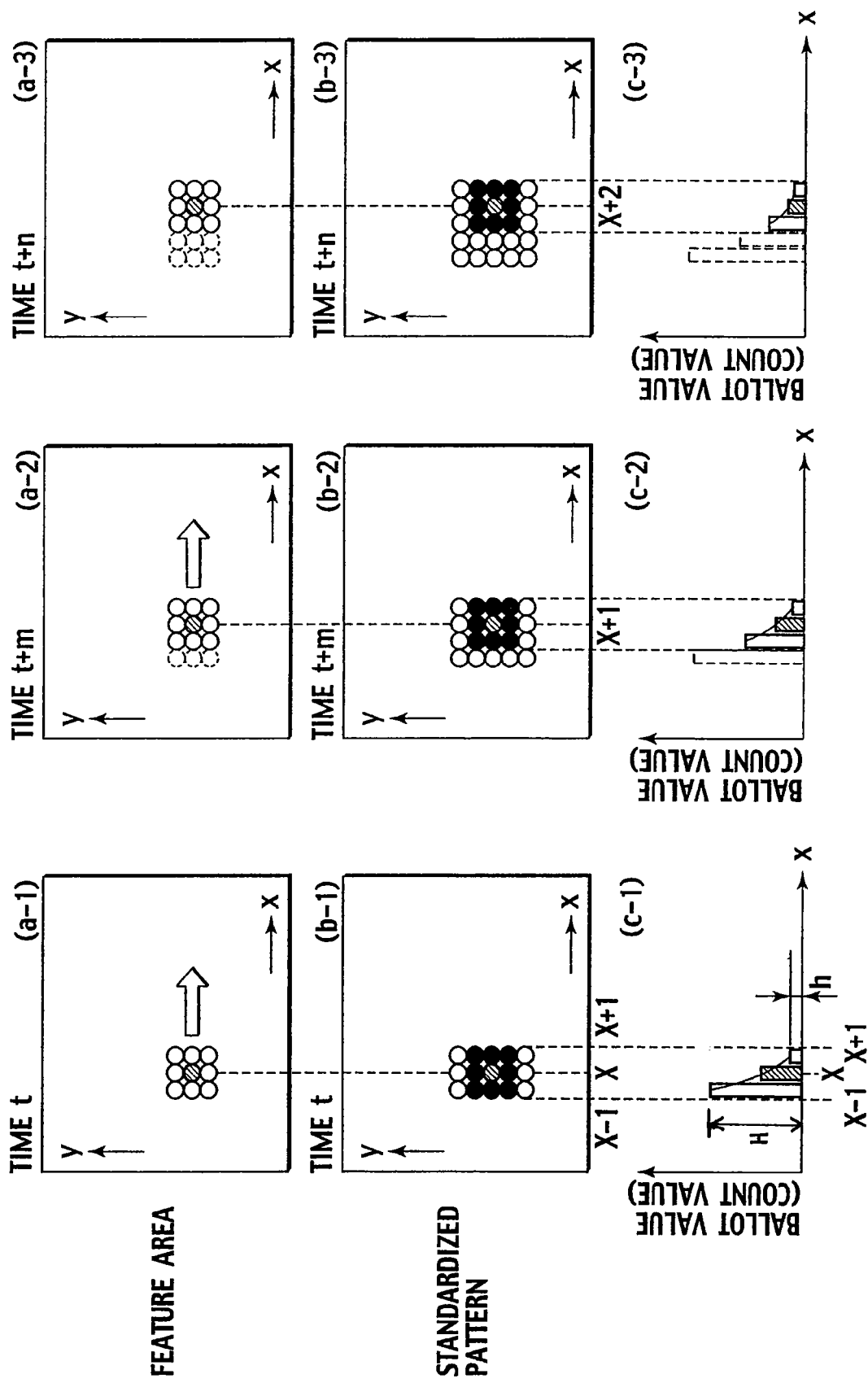
FIG. 6 is a view illustrating balloting operation by a balloting section shown in FIG. 1.

First, at time t, if a frame image, picked up by the image pickup section 1, is inputted to the feature extracting section 2 (step S1), the feature extracting section 2 extracts a feature area (one pixel indicated in the frame image (a-1) under a half-tone state in FIG. 6) from the frame image (step S2).

Then, with the feature standardizing section 3, the binary valuing section 21 executes binary valuing operation for the extracted feature area upon which the thin-line condensing section 22 and the expanding section 23 executes operations to form a standardized pattern including a total nine pixels (pixel areas surrounded by black circles of the frame image (b-1) shown in FIG. 6) centered at the relevant feature area (step S3). Subsequently, the balloting section 4 counts up a ballot value (count value) of the pixel areas (pixel areas on the pixel positions X−1 and X+1 adjacent to the pixel position X that is centered) on which the resulting standardized pattern is located (step S4). For instance, in case where the ballot value of all the pixel areas of the frame image at time t is counted as shown in a graph (c-1) of FIG. 6 and in case where the standardized pattern is formed on the pixel position X+1 even in the frame image at subsequent time t+1, the ballot value on the pixel position X+1 is further counted up upon which the ballot value of the pixel areas, on which no standardized pattern is formed in the frame image at time t+1, is reset.

Next, suppose that in cases where at time t+m (>t), the feature extracting section 2 extracts the feature area (one pixel of the frame image (a-2) under a half-tone state in FIG. 6) upon which the feature standardizing section 3 (the binary valuing section 21, the thin-line condensing section 22 and the expanding section 23) executes the standardizing operation to form the standardized pattern (nine pixels surrounded by the black circles in the frame image (b-2) in FIG. 6), as compared to the frame image at time t, the relevant feature area (at a center position of the standardized pattern) is observed at a pixel position X+1 positively shifted on the x-axis by one pixel (with the one pixel shown in a half-tone state in the frame image (a-2) in FIG. 6). When this takes place, the ballot value on the pixel positions X, X+1, X+2, forming the pixel areas on which the relevant standardized pattern is formed at time t+m, is counted up and the ballot value of the pixel areas, i.e., those on the pixel position X−1, on which the standardized pattern is not formed at time t+m, is reset (see a graph (c-2) in FIG. 6).

Likewise, suppose that in cases where even at t+n (>t+m), the feature extracting section 2 extracts the feature area (one pixel of the frame image (a-3) under a half-tone state in FIG. 6) upon which the feature standardizing section 3 (the binary valuing section 21, the thin-line condensing section 22 and the expanding section 23) executes the standardizing operation to form the standardized pattern (nine pixels surrounded by the black circles in the frame image (b-3) in FIG. 6), as compared to the frame image at time t+m, the relevant feature area (at the center position of the standardized pattern) is observed at a pixel position X+2 positively shifted on the x-axis by one pixel (with the one pixel shown in a half-tone state in the frame image (a-3) in FIG. 6). When this takes place, the ballot value on the pixel positions X+1, X+2, X+3, forming the pixel areas on which the relevant standardized pattern is formed at time t+n, is counted up and the ballot value of the pixel areas, i.e., those on the pixel position X, on which the standardized pattern is not formed at time t+n, is reset (see a graph (c-2) in FIG. 6).

Next, during the course of repeatedly executing the feature extracting operations of the feature extracting section 2, the standardized pattern forming operation of the feature standardizing section 3 (the binary valuing section 21, the thin-line condensing section 22 and the expanding section 23) and the balloting operation of the balloting operation of the balloting section 4, the operation is executed to reset the ballot value (step S5).

Figure 7:
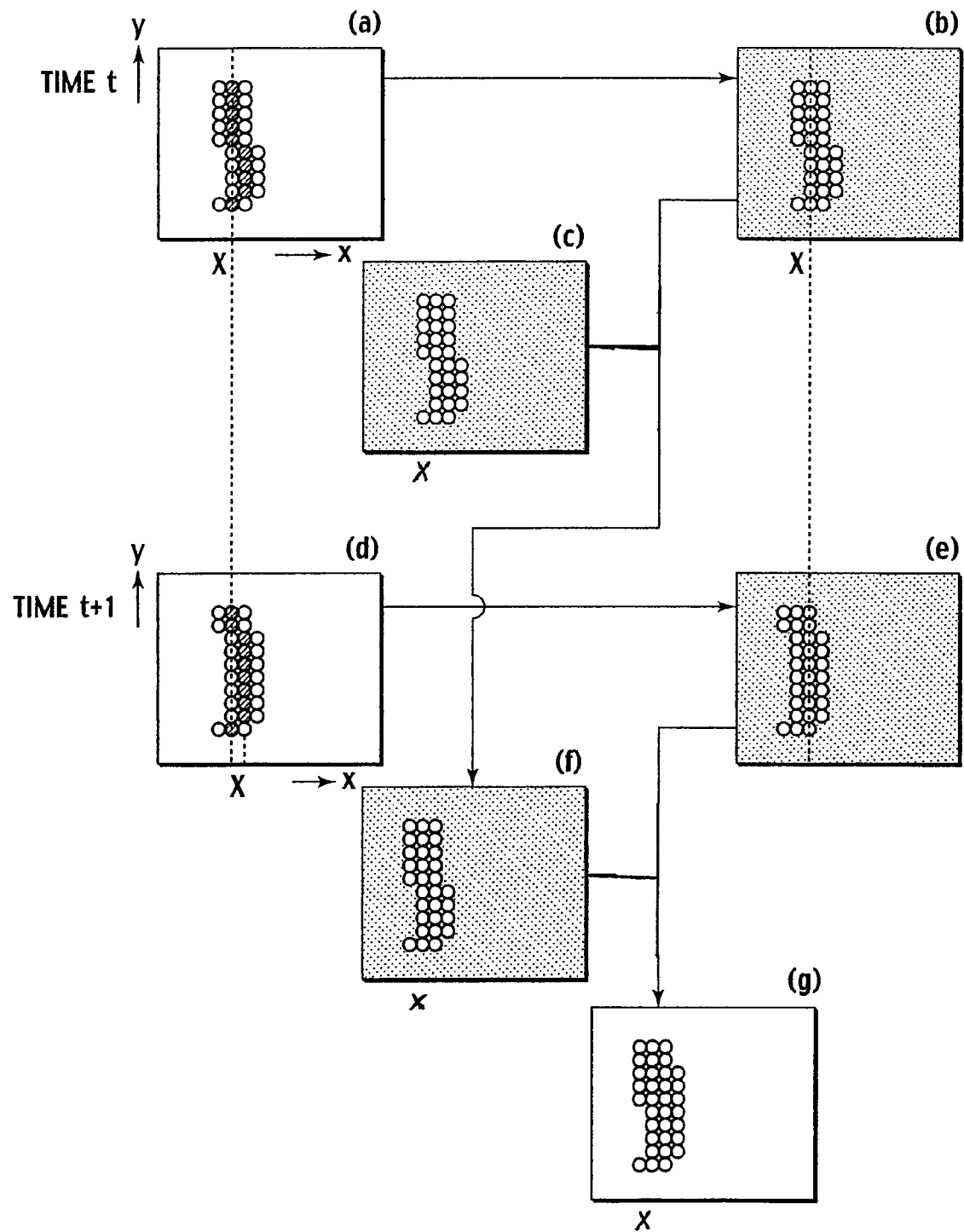
FIG. 7 is a view illustrating masking operation by a balloting section shown in FIG. 1.

In case where edge information is adopted as the feature of the object, as shown in FIG. 7, if at time t, the standardized pattern (a pixel group treated in a half-tone and whitened pixels in the frame image (a) in FIG. 7) is formed based on the feature area (the pixel group treated in the half-tone state in the frame image (a) in FIG. 7) extracted from the feature extracting section 2, the balloting section 4 sets standardized feature area (non-masked area: a whitened pixel group in the frame image (b) in FIG. 7) of the standardized pattern, becoming a target for the balloting operation, and pixel areas (a masked area: a black-colored pixel group in the frame image (b) in FIG. 7) that does not become the target for balloting operation. Successively, the operation is executed to cont up the ballot value of the pixel areas (the frame image (c) in FIG. 7), appearing at time t−1, which correspond to the relevant non-masked area set at time t, while resetting the ballot value of the pixel areas (the frame image (c) in FIG. 7), appearing at time t−1, which correspond to the relevant masked area set at time t. As a result, a new ballot value (a frame image (f) in FIG. 7) is obtained. In succeeding time t+1, likewise, the balloting section 4 sets a masked area (a black-colored region in a frame image (e) in FIG. 7) and a non-masked area (a whitened area in the frame image (e) in FIG. 7) based on the standardized pattern (the half-toned pixel group and the whitened pixel group in the frame image (d) in FIG. 7) becoming the target to be balloted. Subsequently, the operation is executed to count up the ballot value of the pixel areas (a frame image (g) in FIG. 7), appearing at time t, which correspond to the relevant non-masked areas set at time t+1 and reset the ballot value of the pixel areas (the frame image (f) in FIG. 7), appearing at time t, which correspond to the relevant masked areas set at time t+1. In such a way, the operations are executed to calculate the ballot value of the respective pixels on the frame image (g) at time t+1 based on the ballot value of the frame image (f) in FIG. 7 and the frame image (e) in FIG. 7.

Next, the shift speed detecting section 5 retrieves the gradient of the ballot value and the current position of the feature areas based on the ballot value as shown in the graphs (c-1), (c-2), (c-3) in FIG. 6 (step S6).

First, the shift speed detecting section 5 detects a gradient of the ballot value using the ballot value of the three pixels straddling the pixel areas of the standardized pattern and calculates a shift speed of the feature areas as an inverse number of the relevant gradient (step S7).

Further, the shift speed detecting section 5 calculates the current position of the feature areas using the following relational formula:

Current Position of Feature area=$X+h/(H-h)$ (step S7) where X represents a pixel position of the feature area at time t, and h, H represent the minimum ballot value and the maximum ballot value indicated in the graph (c-1) in FIG. 6.

The gradient of the ballot value is determined depending on an interval for which the balloting section 4 counts the ballot value of the pixel area of the standardized pattern. If the frame rate is sufficiently higher than the speed at which the feature area, extracted from the feature extracting section 2, shifts, the standardized patterns certainly overlap each other among the frame images successive in time series. When this takes place, by counting up the ballot value of the pixel areas on which the standardized pattern is formed, the relevant ballot value is substantially equivalent to time for which the standardized pattern is observed on the same pixel area.

In contrast, if the feature areas shift, the ballot value of the pixel areas, on which a standardized pattern is newly generated, takes "1" and this ballot value becomes the minimum value among the ballot values of the entire pixel areas of the standardized pattern. That is, the ballot value of the pixel areas decreases in a shift direction of the feature areas and the ballot value of the pixel areas in a direction, opposite to the shift direction of the feature areas increases. When this takes place, since the gradient of the ballot value straddling the pixel areas of the standardized pattern represents information about how many number of frames are needed for the ballot value of the same pixel areas in the respective frame images to be successively counted before the feature areas shift, the shift speed detecting section 5 is enabled to calculate the shift speed of the feature areas based on the gradient of the ballot value.

Additionally, if the frame rate is sufficiently higher than the shift speed of an actual object, it can be assumed that the object shifts at a constant speed. Accordingly, suppose the feature areas shift in four frames one by one pixel in FIG. 6, the feature areas are observed in two frames in a successive fashion at time t+1 and thus, the calculation is executed at time t+1 such that the feature areas shift from the pixel position X by a value expressed as 2 Frames/{4 Frames/1 Pixel}=0.5 Pixel In such a way, the shift speed detecting section 5 is able to obtain the position of the object based on the pixel positions of the feature areas indicative of the features of the object in the frame image and, in addition, has a capability of obtaining the shift speed of the object based on the gradient of the ballot value straddling the pixel areas of the standardized pattern formed by the feature areas of the object.

As will be obvious from the foregoing description, with the motion detection apparatus and motion detection method of the presently filed embodiment, implementing simple operation like retrieving the feature areas of the frame image at the frame rate sufficiently higher than the shift speed of the object enables the detection of the shift speed of the object.

That is, upon operation of the feature extracting section 2 to extract the feature area, indicative of the features of the object, from the frame images, the feature standardizing section 3 forms the standardized pattern in which the size of the relevant feature area is standardized to a given size. Then, the balloting section 4 counts up the ballot value of the pixel areas (non-masked area) on which the relevant standardized pattern is detected and resets the ballot value of the pixel areas (masked area).

By so doing, it becomes possible to obtain time for which the feature areas are observed from the resulting ballot value, making it possible to easily measure the frame image number, i.e., the shift speed of the feature areas, required for the feature areas to shift by a given pixel number based on the variation in the pixel areas of the standardized pattern, i.e., the gradient of the ballot value associated with the pixel areas of the standardized pattern.

Consequently, with such a motion detection apparatus and motion detection method, since there is no need for calculating correlation values of the brightness among the frame images neighboring in time series, the amount of calculations can be minimized. Also, since there is no need to suppose that the variation in brightness among the neighboring frame images in time series is smoothed in time and space, detection errors can be diminished.

Further, with the motion detection apparatus and motion detection method, the non-masked area (and the masked area that does not become a target for the ballot), which becomes the target for the ballot, is generated based on the standardized pattern by which the feature areas are standardized, thereby minimizing the influence of a unique momentary behavior of the standardized pattern. This results in a capability of calculating the shift direction, the shift speed and the position of the object in a high reliability.

Furthermore, upon using the edge detection filters for the feature extracting section 2, the edge width can be extracted as the feature of the object and the feature standardizing section 3 is enabled to standardize the relevant edge width in the given size.

Similarly, upon using the corner edge detection filter for the feature extracting section 2, the corner edge can be extracted as the feature of the object and the feature standardizing section 3 is enabled to standardize the size of the pixel area on which the relevant corner edge is located.

Likewise, upon using the feature vector calculation filter for the feature extracting section 2, the feature vector can be extracted as the feature of the object and the feature standardizing section 3 is enabled to standardize the size of the pixel area in which the relevant feature vector is detected.

Moreover, while the presently filed embodiment has been described with reference to a case where the feature areas shift in a positive direction only on the x-axis, an alternative may be such that in a case where the corner edge is adopted as a feature of an object, the operation, executed in the x-axis direction in a manner as set forth above, is also implemented in the y-axis direction for synthesizing shift speed vectors associated with the x- and y-axes for thereby obtaining a shift direction of the object and a shift speed associated with the relevant shift direction.

Furthermore, while the presently filed embodiment has been configured to set the masked area and the non-masked area for the standardized pattern upon standardizing one feature area, of course, another alternative may be configured such that a plurality of standardized patterns, in which a plurality of feature areas are formed, respectively, are formed in the same frame image and the masked area and non-masked area are set for the standardized patterns, respectively. In such an alternative, no probability occurs for the masked area, set for a certain standardized pattern, to take the pixel areas of the other standardized pattern and no interaction takes place between the standardized patterns among the plurality of feature areas, enabling the observation of the shift speed in a further accurate fashion.

Besides, since the motion detecting operation in the presently filed embodiment is implemented such that the motion detecting operation is executed only based on the position of the non-masked area, the motion detecting operation can be executed for a less volume of data in a relatively simple sequence, enabling the detection of the shift speed of the object at a higher speed.

Second Embodiment

Now, a motion detection apparatus of a second embodiment is described.

While with the first embodiment, the standardizing size of the feature areas is set to the given size during the standardizing operation of the feature standardizing section 3, the presently filed embodiment features that in the motion detection apparatus of the first embodiment, further, the standardizing size is altered depending on the shift speed of the object. Other structures are similar to those of the first embodiment and description is suitably omitted. Also, with the presently filed embodiment, an edge is adopted as a feature of an object.

Figure 8:
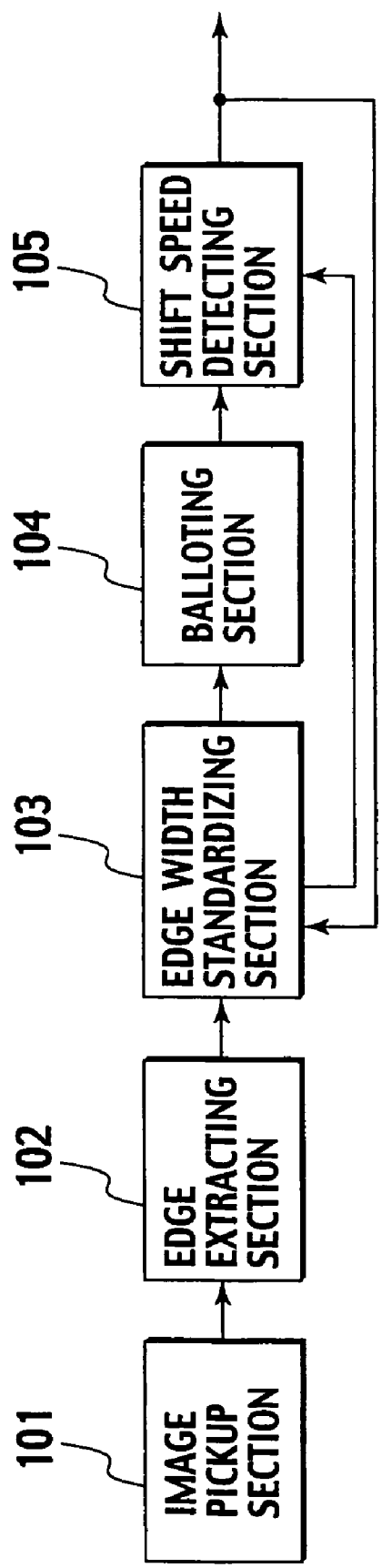
FIG. 8 is a block diagram showing a structure of a motion detection apparatus of a second embodiment according to the present invention.

As shown in FIG. 8, the motion detection apparatus of the presently filed embodiment is comprised of an image pickup section 101, an edge extracting section 102, an edge-width standardizing section 103, a balloting section 104 and a shift speed detecting section 105.

The image pickup section 101 is constructed of an image pickup element such as a CMOS image sensor or a CCD image sensor and executes operation to clip successively picked-up motion images into frame images each for a fixed interval. In this moment, the frame images are clipped at a frame rate adequately higher than the shift speed of an object to be detected.

The edge extracting section 102 extracts an edge from the frame image, inputted from the image pickup section 101, using a Sobel filter for thereby generating an edge image.

The edge-width standardizing section 103 standardizes an edge width of the edge, extracted from the edge extracting section 102, into a given pixel number along a shift direction of the edge. Also, the edge-width standardizing section 103 specifies the edge width of the edge to be standardized depending on the shift speed of the edge.

The balloting section 104 includes a count up mask 141 that counts up values of memory addresses associated with pixel areas (non-masked area), whose standardized edges formed by the edge standardizing section 103 are detected, for storage and resets the values of the memory addresses associated with pixel areas (masked area) whose standardized edges are not detected. Thus, the balloting section 104 stores information about how many number of frames are successive for the standardized edge of the frame image, becoming a target to be currently processed, to be detected in the same pixel areas in the respective frame images.

The shift speed detecting section 105 includes a ballot value gradient calculating section 151 for obtaining a gradient of a ballot value of the pixel areas of the standardized edge based on the ballot value (count value) counted up by the balloting section 104 and calculates a shift speed, a shift direction and a position of the edge based on the ballot value (count value) counted up by the balloting section 104 and the gradient of the ballot value of the standardized pixel areas calculated by the ballot value gradient calculating section 151.

Figure 9:
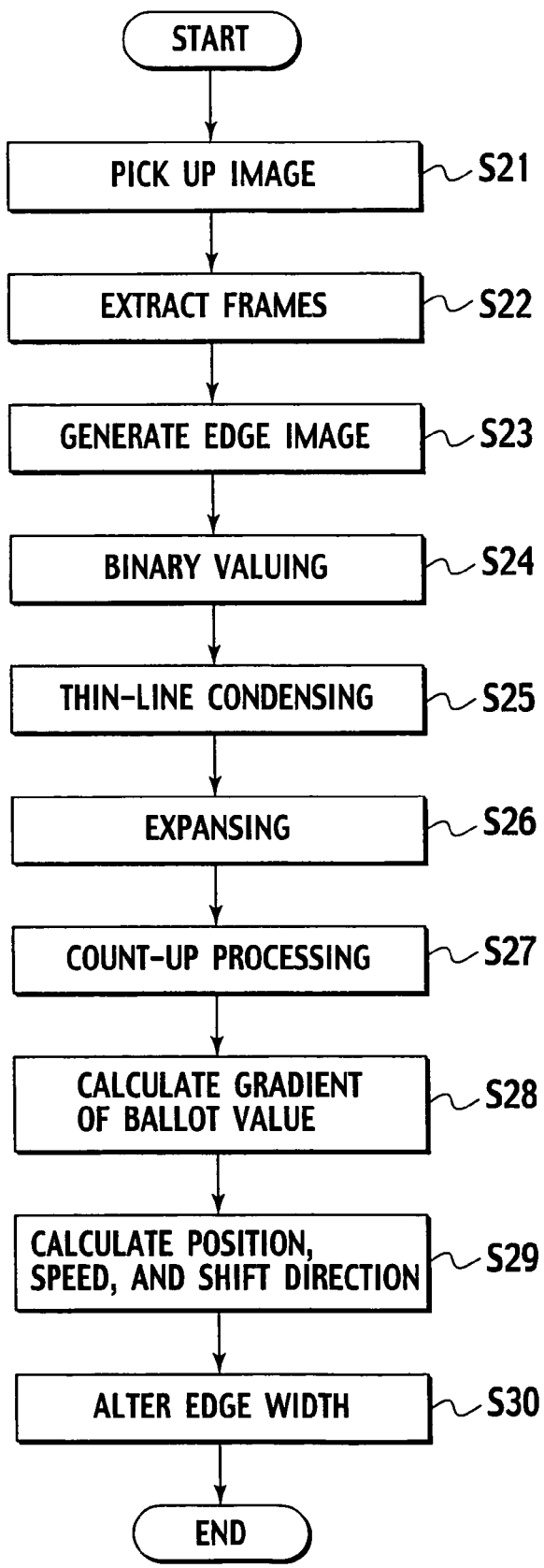
FIG. 9 is a flowchart illustrating a basic sequence of motion detecting operation to be executed by the motion detection apparatus shown in FIG. 8.

Now, a motion detecting process of the motion detection apparatus of the presently filed embodiment is described in detail with reference to a flowchart of FIG. 9.

As the image pickup section 101 picks up a motion image of an object serving as a detection object (step S21) to clip frame images each for a fixed interval for supply to the edge extracting section 10 (step S22). However, in this moment, the frame images are clipped at a frame rate sufficiently higher than a shift speed of the edge.

The edge extracting section 102 extracts an edge of an image using a SOBEL filter for the frame image inputted from the image pickup section 101 for thereby generating an edge image (step S23).

The edge standardizing section 103 standardizes an edge width of the edge, extracted by the edge extracting section 102, to a given pixel number in a shift direction of the object.

Now, standardizing operation of the edge standardizing section 103 for the edge width is described in connection with FIGS. 10 and 11.

Figure 10:
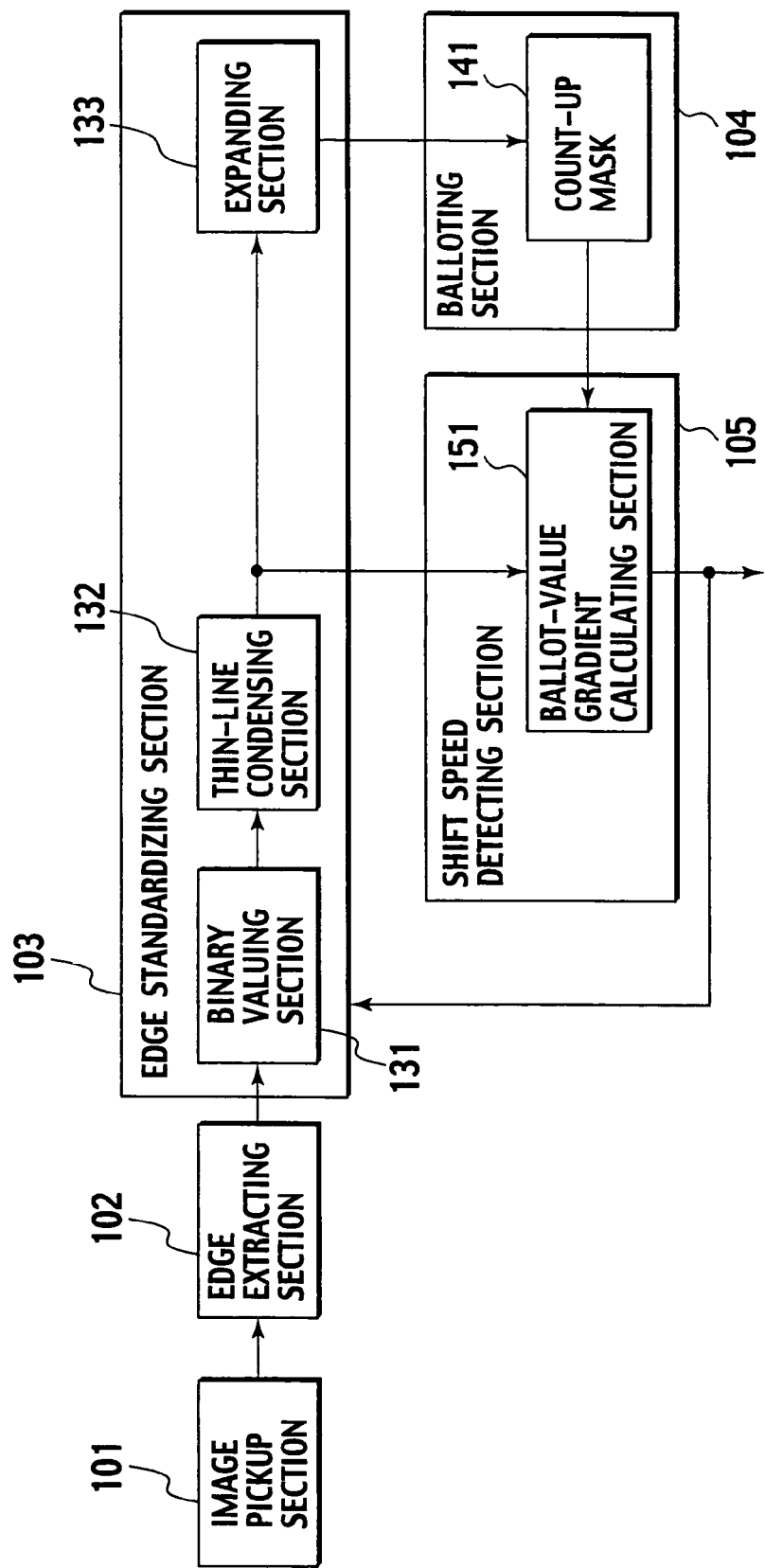
FIG. 10 is a block diagram showing a detailed structure an edge-width standardizing section shown in FIG. 8.
Figure 11:
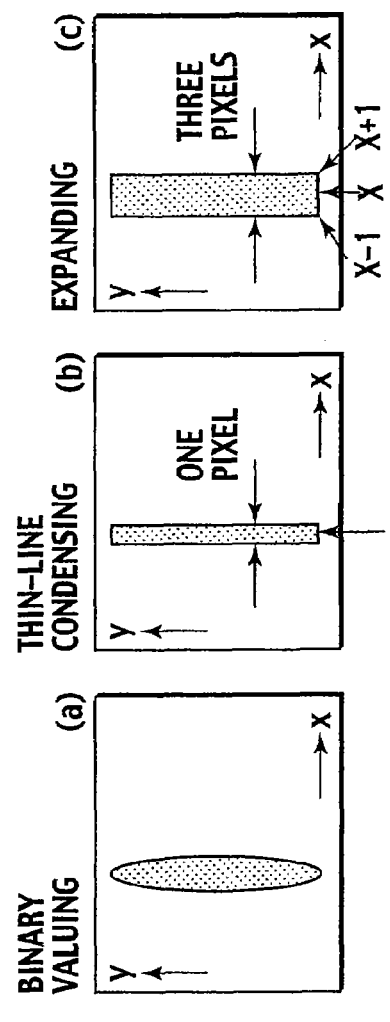
FIG. 11 is a view illustrating thin-line condensing operation and expanding operation by the edge-width standardizing section shown in FIG. 8.

As shown in FIG. 10, the edge-width standardizing section 103 is comprised of a binary valuing section 131 that allows the edge image, generated by the edge extracting section 102, to be valued in a binary state, a thin-line condensing section 132 that converts the edge width of the edge that is valued in the binary state by the binary valuing section 131 in a thin line to a given pixel number, and an expanding section 133 that expands the edge width of the edge, which is formed in the thin line by the thin-line condensing section 132, to a given pixel number.

With the edge standardizing section 103 configured in such a structure, if the edge image is inputted from the edge extracting section 102, the binary valuing section 131 executes binary valuing operation on the edge image (step S24). During this binary valuing operation, a pixel of a pixel area, whose edge is detected, is allocated to take "1" while allocating a pixel of a pixel area, whose edge is not detected to be "0" upon which a binary valued image is generated as shown in a frame image (a) in FIG. 11.

Next, the thin-line condensing section 132 executes thin-line condensing operation for the binary valued image that is valued by the binary valuing section 131 in a binary state (step S25). The thin-line condensing operation is operation in which the edge width of the detected edge is contracted to a given pixel number. With the frame image (b) shown in FIG. 11, the edge width of the edge is condensed to a given pixel number of one pixel. Upon condensing the line of the edge to the given pixel width in such a way, the thin-line condensing section 132 sets a center position to be a center of the edge.

Subsequently, the expanding section 133 executes expanding operation for expanding the edge width of the edge whose line is condensed by the thin-line condensing section 132 (step S26). During this expanding operation, the edge width is expanded in both shift directions of the edge, that is, in one shift direction away from a center position of the edge, set by the thin-line condensing operation, and in the other direction opposite to the one shift direction. With the frame image (c) in FIG. 11, the edge width is expanded in both directions by one pixel, i.e., in the shift direction (positively on the x-axis) away from the pixel position X, forming the center of the edge, and the other direction (negatively on the x-axis) opposite to the shift direction for thereby standardizing the edge width of the edge in three pixels with respect to the shift direction.

Upon executing the thin-line condensing and expanding operations in such a way, the edge-width standardizing section 103 standardizes the edge width of the edge, extracted by the edge extracting section 102, in a given pixel number toward the shift directions of the edge.

Here, although upon executing the thin-line condensing and expanding operations, the edge width is standardized, an alternative may be such that the edge extracting section 102 detects a peak position of the detected edge after which the edge width is standardized in a way to cause the edge width to have pixel widths each by a given pixel number in the shift direction of the edge and in the other direction opposite the shift direction with respect to the edge peak position.

Next, the balloting section 104 executes the operation to count up the standardized edges standardized in a way set forth above (step S27). This count-up operation is implemented such that values of memory addresses of memory regions whose standardized edges are detected are counted up while initializing the values of memory addresses of pixel areas whose standardized edges are not detected.

Now, the count-up operation of the balloting section 104 is described with reference to FIG. 12.

Figure 12:
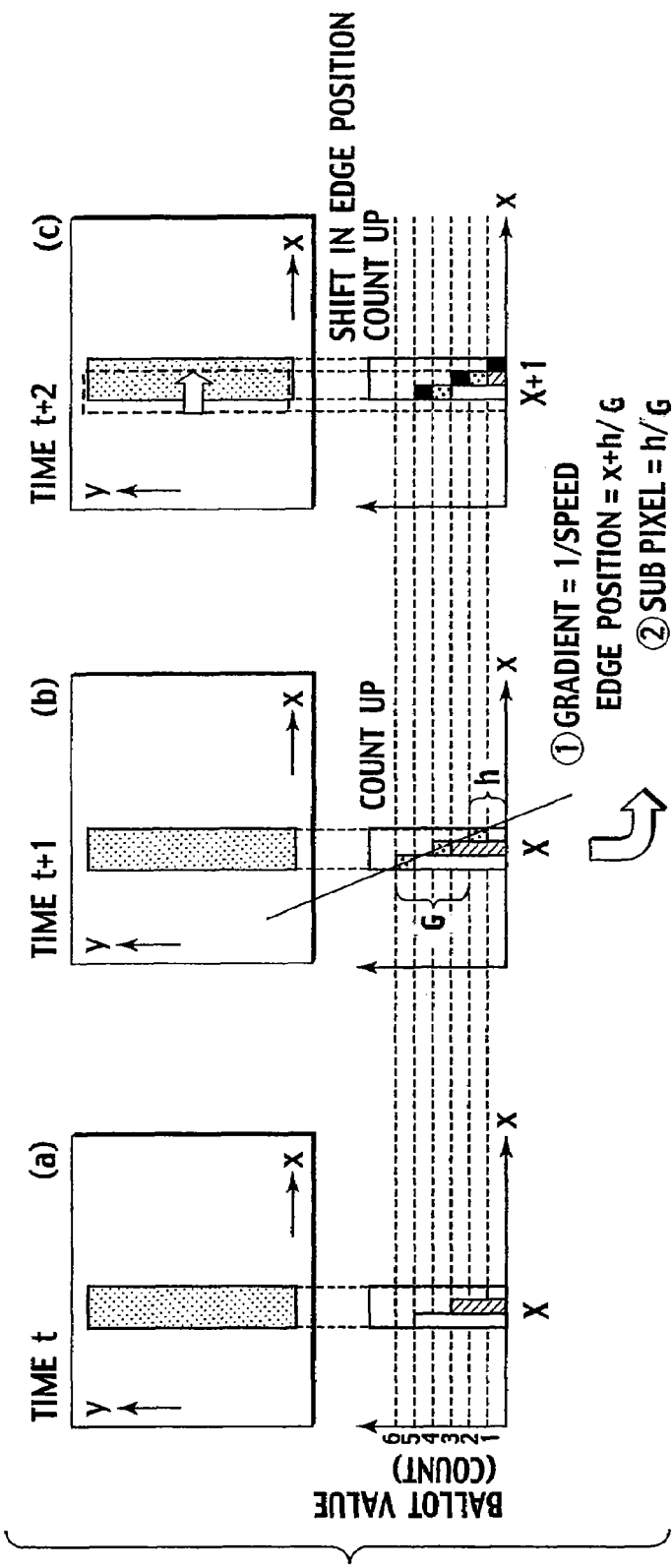
FIG. 12 is a view illustrating a count up operation of the balloting section shown in FIG. 8.

As shown in FIG. 12, it is supposed that in a frame image (a) at time t, the edge width is expanded from a pixel position X−1 to the other pixel direction X+1 in both directions, including a shift direction of the edge and the other direction opposite to the shift direction, by one pixel, respectively.

In this case, the balloting section 104 counts up ballot values of the pixel positions X−1, X and X+1, whose standardized edges are detected by the count-up mask 141 one by one, and a ballot value of the pixel areas, whose standardized edges are not detected, is reset.

In a frame image (a) in FIG. 12, since the standardized edges are detected on the pixel positions X−1, X and X+1 at time t, the ballot values are counted up at the respective pixel positions one by one such that the pixel position X+1 takes the ballot value of 1, the pixel position X takes the ballot value of 3 and the pixel position X−1 takes the ballot value of 5.

No edge shifts at time t+1, the standardized edges are detected at the pixel positions X−1, X and X+1 and, as shown in the frame image (b) in FIG. 12, the ballot values of the pixel positions X−1, X and X+1 are further counted up one by one such that the pixel position X+1 takes the ballot value of 2, the pixel position X takes the ballot value of 4 and the pixel position X−1 takes the ballot value of 6.

Further, at time t+2, the edge shifts in a positive direction on the x-axis by one pixel upon which the standardized edges are detected at the pixel positions X, X+1 and X+2. Accordingly, the ballot values of the pixel positions X, X+1 and X+2, whose standardized edges are detected, are counted up, while resetting ballot value of the pixel area X−1 whose standardized edge is not detected. As a result, as shown by a frame image (c) in FIG. 12, the pixel position X+2 takes the ballot value of 1, the pixel position X+1 takes the ballot value of 3 and the pixel position X takes the ballot value of 5. In addition, the ballot value of the pixel position X−1, whose standardized edge is not detected, is reset to "0".

In such a way, the balloting section 104 counts up the ballot values of the pixel positions whose standardized edges are detected, while resetting ballot values of the pixel areas whose standardized edges are not detected.

While in FIG. 12, the ballot values are detected at a sum of three positions, i.e., the pixel positions X−1, X and X+1, as the pixel areas of the standardized edges, the ballot values of any positions may be detected provided that the gradient of the ballot values is obtained as will de described below.

Further, if the frame rate is set to be sufficiently higher than the speed in which the edge (at a central pixel position of the standardized edge) shifts, the standardized edges are detected a number of times on the same pixel areas for frame images successively appearing in time series. In case of FIG. 12, the standardized edge in the pixel position X is detected two times at times t and t+1. Consequently, the ballot value, resulting when the ballot values of the pixel areas whose standardized edges are detected, is substantially equivalent to a time interval (frame number) during which the standardized edges are detected in the relevant pixel area. Particularly, this means how many number of frames are needed after the edge has shifted for the minimum ballot value h, among the ballot values of the pixel areas on which the standardized edges are located, to be located on the same pixel area.

Subsequently, the shift speed detecting section 105 calculates a shift speed, a shift direction and a position of the edge. The shift speed detecting section 105 initially calculates a gradient of the ballot values of the pixel areas of the standardized edges (step S28) and depending on the gradient of the ballot value, calculates the shift direction, the shift speed and the position of the edge (step S29).

Hereunder, this calculation method is described with reference to FIG. 12. In case of the frame image (b) in FIG. 12, the pixel positions X−1, X and X+1 have the ballot values of 6, 4 and 2, respectively. Therefore, upon subtracting the ballot value 2 at the pixel position X+1 from the ballot value 6 at the pixel position X−1, the gradient of the ballot value can be calculated as G=(6−2)/2=2. This means G={(Time Interval needed for Standardized Edge to shift from Pixel Position X−1 to Pixel Position X+1)}/(2 Pixels)

Accordingly, the gradient G of the ballot values is substantially equivalent to the time interval (frame number) needed for the standardized edges to pass across the pixel position X. That is, the gradient G of the ballot values is equivalent to obtain information about how many number of frames are needed for the standardized edge to shift by one pixel and the shift speed 1/G of the edge can be calculated based on the gradient G of the ballot value.

In the frame image (b) in FIG. 12, two frames are needed for the standardized edge to shift by one pixel and, hence, the shift speed of the edge can be calculated to be ½ (pixel/frame). Likewise, even in the frame image (c) in FIG. 12, the gradient of the ballot value is expressed as G=(5−1)/2=2 and, hence, the shift speed of the edge is expressed as ½ (pixel/frame).

Further, the shift direction of the edge can be judged on a size of the ballot value. The pixel area, appearing when the edge shifts and a new standardized edge is detected, has a ballot value of 1 that forms a minimal value among the ballot values of the respective pixel positions. Consequently, the ballot value in a direction in which the edge shifts is small and the ballot value in a direction opposite to the direction in which the edge shifts is large, whereby it becomes possible to judge the shift direction of the edge.

In addition, if the frame rate is set to be sufficiently higher than the speed at which the edge shifts, it is assumed that the object is moving at a constant speed. Moreover, among the ballot values of the pixel areas on which the standardized edges are located, the minimal ballot value "h" means that the standardized edge is located on the same position for a time interval in which the standardized edge is detected at the relevant pixel position, that is, the given number of frames needed after the edge has shifted.

From the foregoing, suppose a center position of the edge is X, the position of the edge can be given as expressed below.

Current Position of Edge=X+h/G

In the frame image (b) in FIG. 12, since at time t+1, the edge is detected in the same pixel position two successive frames at the edge speed of ¼ (pixel/frame), the pixel position of the edge at time t+1 can be calculated to assume a position shifted from the pixel position by 2 (Frame)×{½ (Pixel/Frame)=1 Pixel}

Upon calculating the shift speed, the shift direction and the position of the edge in such a way, the shift speed detecting section 105 transmits the calculated shift speed to the edge standardizing section 103. Upon receipt of the shift speed, the edge standardizing section 103 alters the edge width of the edge to be standardized (step S30). In the frame image (c) in FIG. 12, although the edge width, subsequent to the standardizing operation, has three pixels in respect of the shift direction of the edge, the edge width in respect of the shift direction of the edge is altered to be greater than the three pixels when the received shift speed is high whereas when the shift speed is low, the edge width in respect of the shift direction of the edge is altered to be smaller than the three pixels.

Thus, altering the edge width for standardization enables the edge width to be standardized such that the standardized edges overlap one another between the frame images successive in time series in accordance with the sift speed, making it possible to expand a range of the shift speed available for detection.

As set forth above, the motion detection apparatus and motion detection method of the presently filed embodiment have advantageous effects, in addition to those of the first embodiment, wherein the edge-width standardizing section 103 is structured to allow the edge width, to be standardized, to be altered depending on the shift speed calculated by the shift speed detecting section 105 whereby even in the presence of variation in the shift speed of the object, the edge width can be standardized to allow the standardized edges to overlap one another between the successive frames for thereby expanding the range for the shift speed of the object available for detection.

Third Embodiment

Next, a motion detection apparatus of a third embodiment is described below.

Although in the first embodiment, no particular mention is made to a timing at which a ballot value is reset in balloting operation, the presently filed embodiment features that the motion detection apparatus of the first embodiment is further configured to control the timing at which the ballot value is reset depending on shift speed of an object. Other structures are the same as the first embodiment and description is suitably omitted. Also, with the presently filed embodiment, an edge is adopted as a feature of the object.

Figure 13:
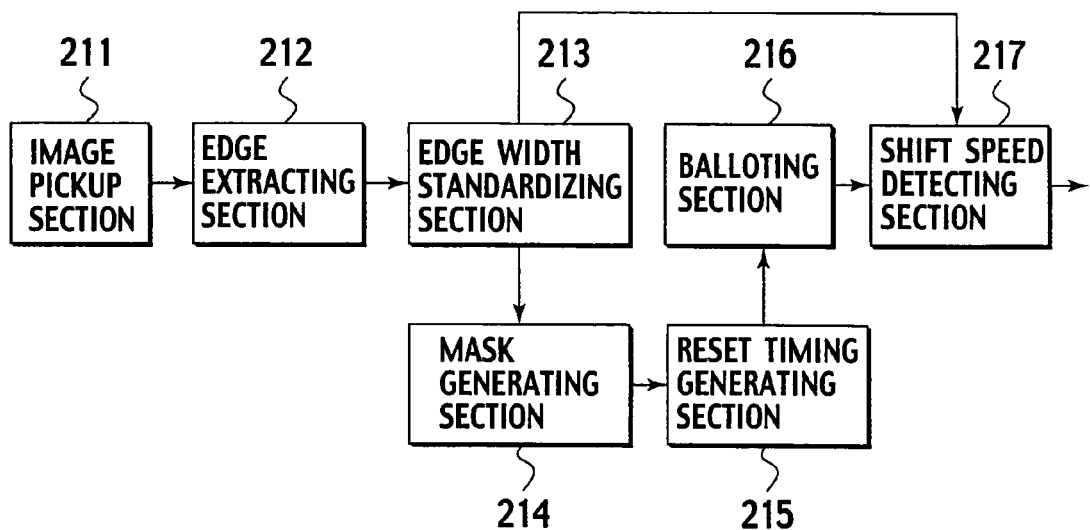
FIG. 13 is a structural view of a motion detection apparatus of a third embodiment according to the present invention.

As shown in FIG. 13, the motion detection apparatus of the presently filed embodiment is comprised of an image pickup section 211, an edge extracting section 212, an edge-width standardizing section 213, a mask generating section 214, a reset timing generating section 215, a balloting section 216 and a shift speed detecting section 217.

The image pickup section 211 is constructed of an image pickup element such as a CMOS image sensor or a CCD image sensor and executes operation to clip successively picked-up motion images into frame images each for a fixed interval.

The edge extracting section 212 extracts an edge from the frame image, inputted from the image pickup section 101, using a Sobel filter for thereby generating an edge image.

The edge-width standardizing section 213 forms a standardized edge in which a width of the edge, extracted from the edge extracting section 212, is standardized into a given pixel number toward a shift direction of the edge.

The mask generating section 214 sets a pixel area, on which the edge (standardized edge), standardized by the edge standardizing section 213, is not detected, to be a masked area for the standardized edge. In particular, the mask generating section 214 sets the pixel area, resulting from a logical product between the masked area of the standardized edge in a preceding frame and the pixel area whose standardized edge is not detected in the current frame is set to be the masked area for the relevant standardized edge of the current frame for a plurality of standardized edges, respectively, which are standardized by the edge standardizing section 213.

The reset timing generating section 215 sets a reset timing at which the ballot value is counted up by the balloting section 216, and the masked area is generated by the mask generating section 214. More particularly, the reset timing is generated when judgment is made that non-masked areas of adjacent edges overlap one another, while resetting the ballot value, counted up by the balloting section 216, the masked area generated by the mask generating section 214. Also, the edge, wherein no adjacent overlapping edges are present and the masked areas are continuously counted, may be automatically reset upon elapse of a fixed time interval.

The balloting section 216 counts up the ballot values of the pixel areas on which the non-masked areas generated by the mask generating section 214 are located. In particular, the balloting section 216 counts up the content of memory addresses associated with the non-masked area while, in contrast, resetting the content of memory addresses associated with the masked area. Thus, by executing the balloting among the frame images successive in time series for storing the ballot values, it becomes possible to obtain information about how many number of frames are successively observed for the standardized edge.

The shift speed detecting section 217 calculates a shift direction, a shift speed and an acceleration of the edge based on the gradient of the ballot values stored straddling the frame images successive in time series.

Now, standardizing operation of the edge width of the edge-width standardizing section 213, mask generating operation of the mask generating section 214, balloting operation of the balloting section 216, operations of the shift speed detecting section 217 to calculate the shift direction and the shift speed of the edge, and operation of the reset timing generating section 215 for generating reset timing are described in detail with a focus on concrete examples.

Figure 14:
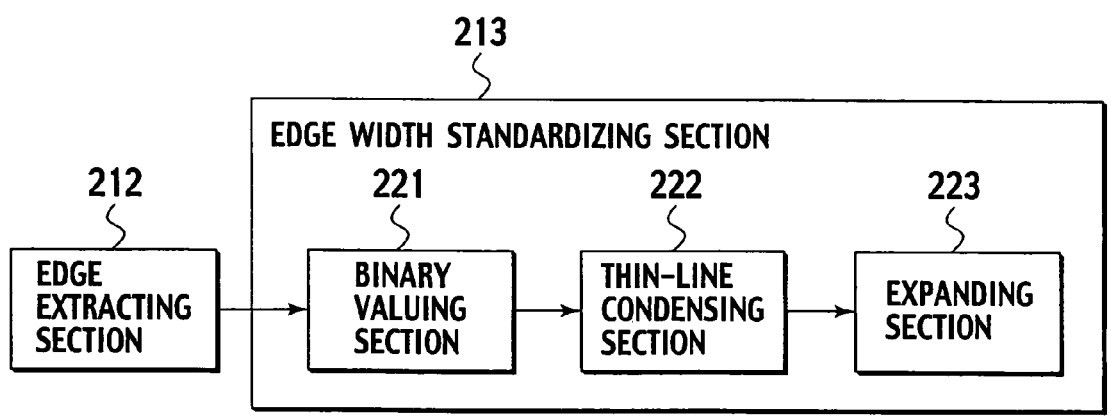
FIG. 14 is a concrete structural view of an edge-width standardizing section shown in FIG. 13.

First, referring to FIGS. 14 and 15, the standardization on the edge width to be executed by the edge-width standardizing section 213 is described.

As shown in FIG. 14, in particular, the edge standardizing section 213 is comprised of a binary valuing section 221 that allows the edge image, generated by the edge extracting section 212, to be valued in a binary state, a thin-line condensing section 222 that repeatedly executes the thin-line condensing operations until the edge width reaches a given pixel number to unify an entire edge width to a given pixel number, and an expanding section 223 that expands the unified edge width to a given pixel number.

With the edge standardizing section 213 configured in such a structure, the binary valuing section 221 executes binary valuing operation on the extracted edge image as shown by the frame (a) in FIG. 15 (with a pixel in a white circle taking a value of "0" while a pixel in a half-tone circle takes a value of "1" (active)).

Next, the thin-line condensing section 222 executes thin-line condensing operation on the edge width so as to allow the same to be contracted to a given pixel number (one pixel in the x-axis direction) for thereby unifying the edge width to the given pixel number (one pixel) as shown by the frame image (b) in FIG. 15. Subsequently, the expanding section 223 expands the edge, whose edge width is unified, to a given pixel number (three pixels). When the edge, becoming a target for thin-line condensing operation, is observed in the pixel position X, the pixel positions X−1 and X+1 are allocated with "1" and the edge width is standardized in three pixels.

Upon executing the binary valuing operation, the thin-line condensing operation and the expanding operation in such a way, the edge-width standardizing section 213 forms a standardized edge, whose edge width is standardized in a given value (three pixels), from the edge extracted from the edge extracting section 212.

Also, when standardizing the edge width, a peak position of the edge, extracted by the edge extracting section 212, may be detected upon which the binary valued image, which is caused to have a width of the given pixel number, is generated on the relevant edge peak position for thereby standardizing the edge width.

Next, the masking operation to be executed by the mask generating section 214 is described with reference to FIG. 16.

The mask generating section 214 executes operation on each of a plurality of standardized edges standardized by the edge standardizing section 213 such that areas, resulting from a logical product between the masked area of the edge in a preceding frame and an area, whose edge is not detected in the current frame, are set to be masked areas for the relevant edges of the current frame.

Although this logic calculation is a positive logic calculation with the masked area and the area, in which no edge is detected, being treated as true values, negative logic calculation is employed for logic calculation with a view to providing the ease of understanding. That is, the area, resulting from the logical sum between the non-masked area of the edge in the preceding frame, and the area, in which the edge is detected in the current frame, is set to be the non-masked area of the edge for the current frame.

Figure 16:
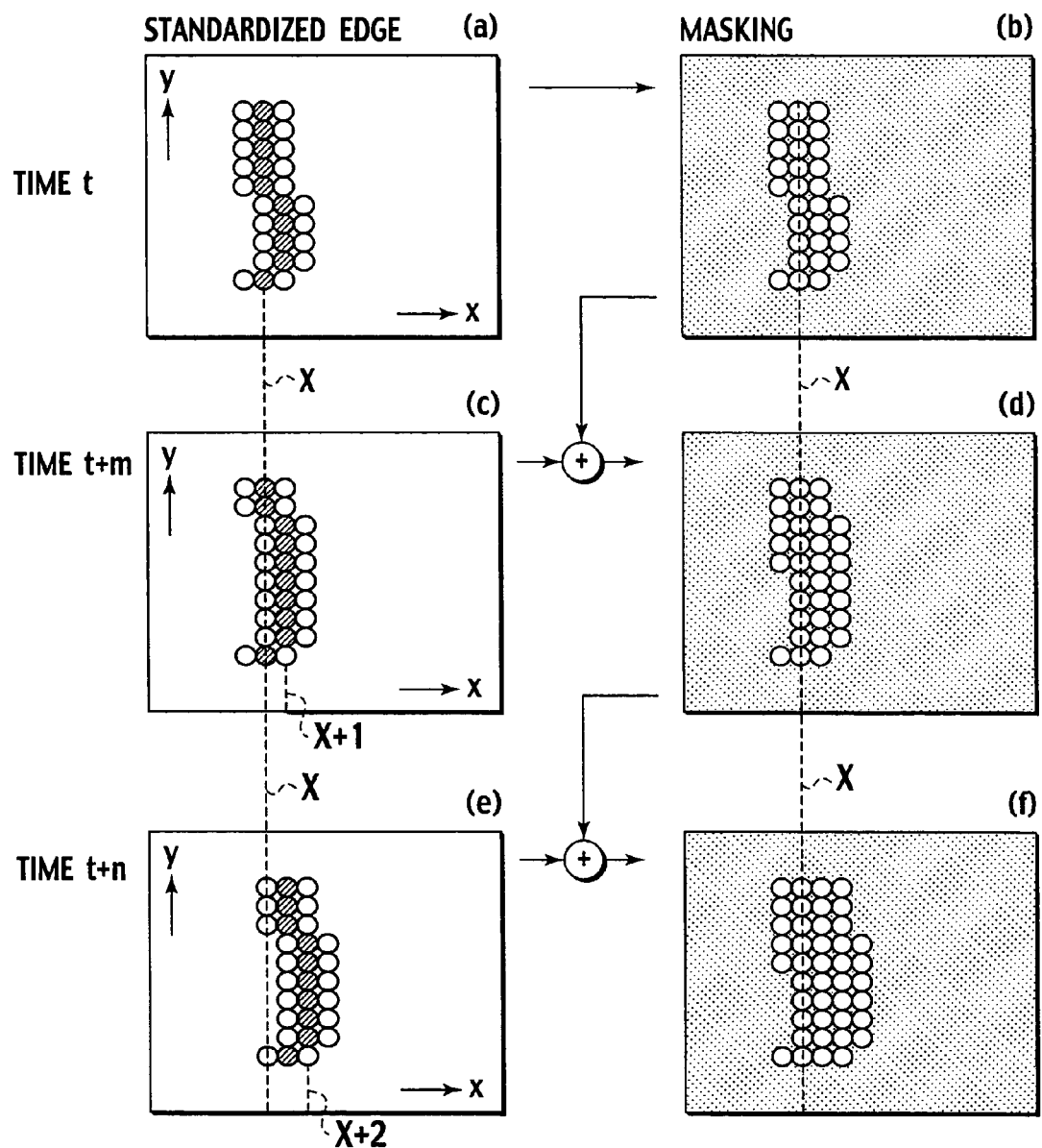
FIG. 16 is a view illustrating standardizing operation by the edge-width standardizing section shown in FIG. 13.

A frame image (a) in FIG. 16 represents a standardized edge at time t. Here, the edge-width standardizing section 213 standardizes the edge width of the relevant standardized edge with three pixels (in half-tone shaded circles and whitened circles) in the direction on the x-axis. At time t, supposing that the reset timing generating section 215 generates the reset timing, the pixel areas, whose standardized edges are not detected, become a masked area intact (a black-colored area in the frame image (b) in FIG. 16). Also, in the frame image (b) in FIG. 16, a whitened area represents a non-masked area.

Next, supposing that the standardized edges vary as shown in the frame image (c) in FIG. 16 at time t+m (>t), the area, resulting from the logical sum between the non-masked area (whitened area in the frame image (b) in FIG. 16) at time t, and the pixel areas, whose edges are detected at time t+m, are obtained as the non-masked area (whitened area in the frame image (d) in FIG. 16) at time t+m. When this takes place, in the frame image (d) in FIG. 16, the black-colored area, which is a complementary set of the non-masked area, is obtained as the masked area.

Likewise, supposing that the standardized edge image is varied as shown in a frame image (e) in FIG. 16 at time t+n (>t+m), the area, resulting from the logical sum between the non-masked area (whitened area in the frame image (d) in FIG. 16) at time t+m, and areas, whose edges are detected at time t+n, is obtained as the non-masked area (whitened area in a frame image (f) in FIG. 16) at time t+m. When this takes place, in the frame image (f) in FIG. 16, the black-colored area, which is the complementary set of the non-masked area, is obtained as the masked area.

Next, the balloting operation of the balloting section 216 is described with reference to FIG. 17.

Figure 17:
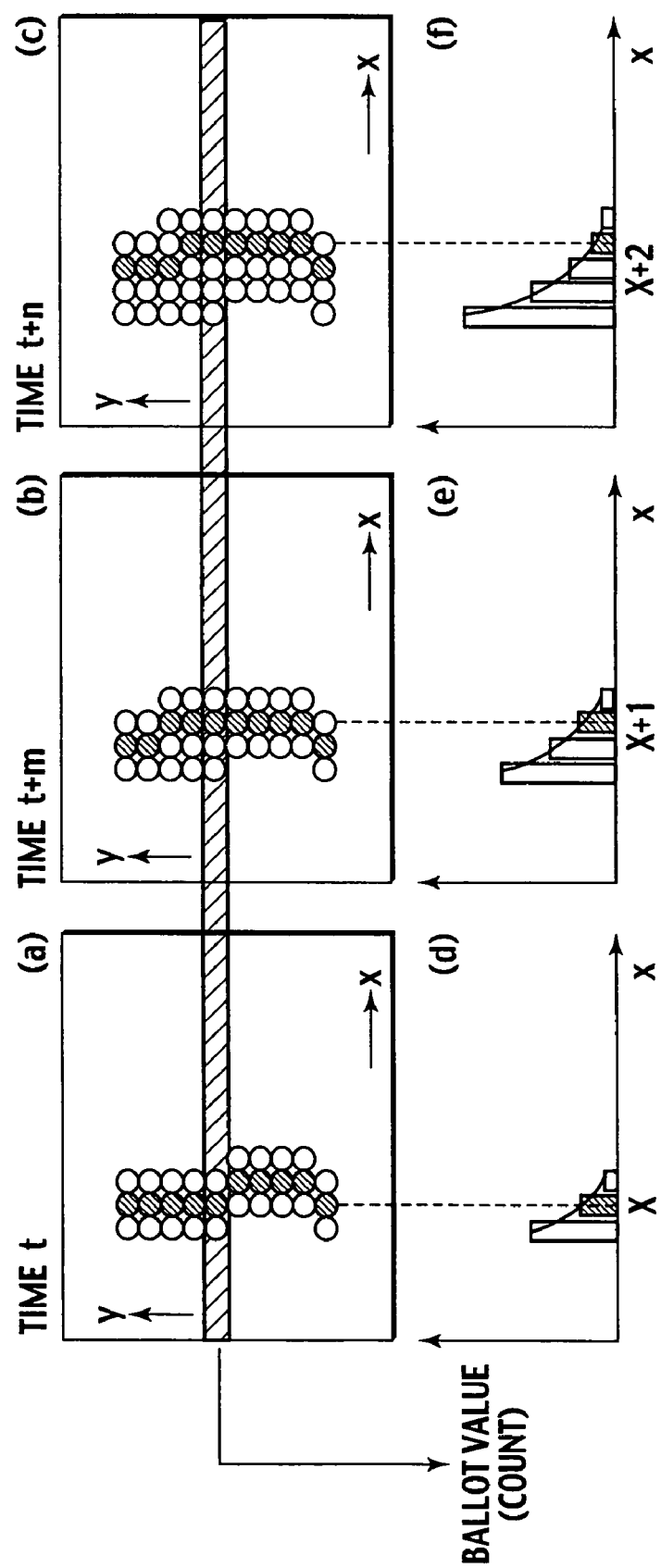
FIG. 17 is a view illustrating balloting operation of the balloting section shown in FIG. 13.

First, if the non-masked area (half-tone shaded circles and whitened circles in the frame image (a) in FIG. 17) is generated by the mask generating section 214 at time t, the balloting section 216 counts up the ballot value of the pixel areas on which the relevant non-masked area is located. In this moment, the ballot value of the pixel areas, on which the masked area (whitened area in the frame image (a) in FIG. 17) forming the complementary set of the non-masked area is located, is reset.

Next, under circumstances where the non-masked area is varied like the frame image (b) in FIG. 17 at time t+m (>t) and where the non-masked area is varied like the frame image (c) in FIG. 17 at time t+n (>t+m), similarly, the ballot value of the pixel areas, on which the non-masked area (in half-tone shaded circles and whitened circles) is located, are counted up and the ballot value of the pixel areas, on which the masked area (whitened area) is located, are reset.

Now, the methods of calculating the shift direction, the shift speed and the acceleration of the edge to be executed by the shift speed detecting section are described.

In case where the frame rate is sufficiently higher than the shift speed of the edge that is moving, the standardized edge observed among the frame images successively appearing in time series has areas overlapping each another (in this case, two pixels overlaps each other in the x-axis direction) in most of cases. As set forth above, with the balloting section 216 counting up the ballot value of the pixel areas on which the standardized edge is located, the accumulated ballot value is substantially equivalent to a time interval for which the relevant standardized edge is observed in the same position.

When the edge shifts, the ballot value of the pixel areas, on which the standardized edge is newly observed, takes a value of 1, which is a minimum value among all the pixel areas of the standardized edge. That is, the ballot value progressively decreases toward a direction in which the edge shifts and, in contrast, progressively increases toward a direction opposite to that in which the edge shifts. The gradient of the ballot value is a counted value representing how many number of frames are successively observed in the same position before the edge shifts and using a profile (values of primary and secondary differentiations) of this ballot value enables the calculation of the shift speed and acceleration of the edge. In case of a graph (f) shown in FIG. 17, it becomes possible to detect the shift speed and acceleration of the edge, which is noticed, from the gradient of the ballot value of the pixel area between the pixel position X−1 and the pixel position X+3.

Figure 18:
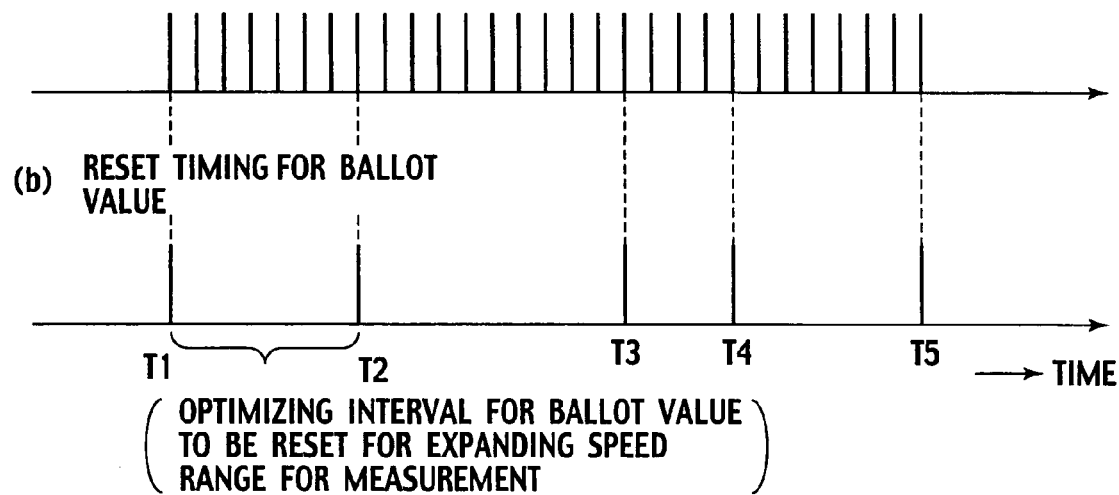
FIG. 18 is a time chart illustrating a frame retrieval timing and a reset timing for a reset timing generating section shown in FIG. 13.

Next, referring to FIG. 18, the operation of the reset timing generating section 215 to generate reset timing is described.

In cases where the frame rate is sufficiently higher than the shift speed of the edge for an object to be observed, it is conceivable that the relevant edge scarcely shifts between the frame images that successively appear in time series and, thus, it is supposed that the relevant edge is in a motion at a constant speed.

However, when a time interval for which the motion of the edge is observed is short, there is an edge, which instantaneously appears or disappears, and upon receipt of an influence of the ballot value related to such an edge, deterioration occurs in a reliability of measuring the shift speed and the acceleration of the edge serving as a principal object to be observed. On the contrary, when the time interval for which the motion of the edge is observed is long, there is a probability wherein the shift speed of the edge increases or decreases with a resultant difficulty in fitting the relationship between the time and the speed on a graph. Thus, it becomes hard to accurately analyze a speed profile of the edge for an object to be observed. That is, it is preferable to set down a cycle for the shift speed of the relevant edge to be measured in conformity with a dynamics of the edge for the principal object to be observed.

To this end, it is desired that the ballot value resulting from the balloting section 216 is a meaningful value and the motion of the relevant edge is observed within a range of variation in time to the extent not to cause the speed profile of the edge, for the object to be observed, to be complex.

Further, in cases where there is an edge adjacent to the edge for the object to be observed, since the masked area is also similarly generated for these adjacent edges based on the standardized edge, the pixel areas, on which the non-masked area of the adjacent edges is located, overlap each other with the resultant occurrence of noise applied to the ballot value of the pixel areas located in the overlapped areas. Consequently, under circumstances where the pixel areas, on which the non-masked area of the adjacent edges is located, overlap each other, the reset timing generating section 215 needs to generate a reset timing for resetting the ballot value of the balloting section 216 and the masked area.

Figure 19:
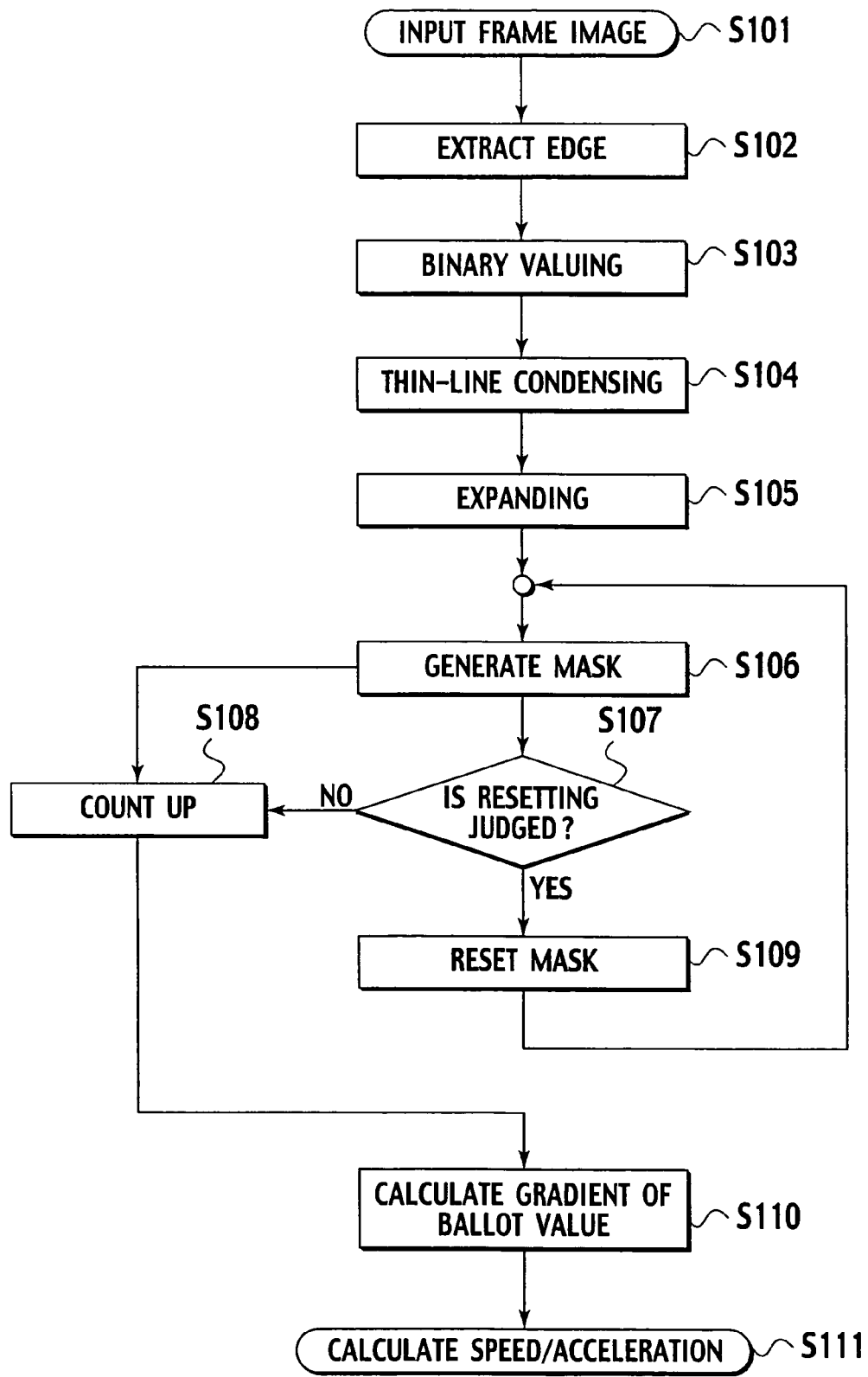
FIG. 19 is a flowchart illustrating motion detecting operation of the motion detection apparatus shown in FIG. 13.

Next, the standardizing operation for the edge width of the edge-width standardizing section 213, the masking operation of the mask generating section 214, the balloting operation of the balloting section 216, the operations of the shift speed detecting section 217 to calculate the shift direction, the shift speed and the acceleration of the edge, and the operation of the reset timing generating section 215 to generate reset timing are described with reference to FIG. 19.

In step 101, a frame image, clipped by the image pickup section 211, is inputted to the edge extracting section 212. In step S202, the edge extracting section 212 extracts an edge. In step S103, binary valuing operation is executed on the extracted edge and in step S104, thin-line condensing operation is conducted upon which an edge width of the extracted edge is unified in a given pixel number (one pixel). Subsequently, in step S105, the edge width, unified to the one pixel, is expanded to a given pixel number (three pixels) for thereby standardizing the extracted edge in a standardized edge in a given width (three pixels).

In succeeding step S106, a masked area for the current frame is generated based on a non-masked area calculated on a logical sum between the standardized edge, formed in operations from step S103 to step S105, and the non-masked area of the relevant edge of a preceding frame.

In subsequent step S107, the reset timing generating section 215 executes comparison in effective pixel number between the masked area in the preceding frame and the masked area in the current frame upon which if there is a change, exceeding a given value, in the effective pixel number, judgment is made that the non-masked areas of the adjacent edges overlap each other, thereby generating a reset timing. Then, in step S109, the operation is executed to reset the accumulated ballot value and the masked area. Subsequently, the operation is routed back to step S105, after which the masked area is generated based on only the standardized edge formed in operations from step S103 to step S105, and the operation proceeds to step S107. Also, in step S107, if judgment is made that no overlapping takes place between the non-masked areas of the adjacent edges, the operation proceeds to step S108.

In next step S108, the operation is executed to count up a ballot value of memory addresses of the pixel areas corresponding to the effective pixels (pixels in the non-masked area) based on the non-masked area generated in step S106, while resetting the ballot value of the memory addresses of the pixel areas corresponding to the ineffective pixels of the masked area.

Further, in step S110, the operation is executed to obtain a gradient of the accumulated ballot value, while calculating a shift direction, a shift speed and an acceleration of the edge in step S111.

As will be apparent from the foregoing description, with the motion detection apparatus of the presently filed embodiment, the reset timing generating unit 215 serves to set the reset timing, at which the balloting section 216 resets the ballot value and the masked area, based on the positional relationship between the edge, becoming a target to be observed, and the adjacent edge. More particularly, when overlapping takes place between the non-masked area of the edge, becoming the target to be observed, and the adjacent edge, the reset timing is generated to reset the ballot value of the balloting section 216 and the masked area.

Accordingly, with the motion detection apparatus and motion detection method of the presently filed embodiment, in addition to the advantageous effects, it becomes possible to enhance a time interval for which the shift speed and the acceleration of the edge are observed until the non-masked areas of the edge for the object to be observed and the adjacent edge, resulting in a capability of improving an S/N ratio related to the detection of the speed varying in time series. That is, in the presently filed embodiment, since a logical product between the masked area of the standardized edge in a preceding frame and the pixel area whose standardized edge is not detected in the current frame is set to be the current masked area, it becomes possible to calculate accurately the acceleration of the edge in addition to the advantageous effects.

Fourth Embodiment

Lastly, a motion detection apparatus of a fourth embodiment is described.

While the third embodiment has been described with reference to the control method in which the timing, at which the ballot value is reset, is controlled in balloting operation depending on the shift speed of the object, the presently filed embodiment features that the operation is executed to control the timing, at which the ballot value is subjected to the balloting operation (counting up and resetting of the ballot value), in accordance with the positional relationship between a vanishing point (described later) on a frame image and a feature area of an object. Other structures are similar to those of the first embodiment and description is remarkably omitted. Also, with the presently filed embodiment, an edge is adopted as a feature of the object.

Figure 20:
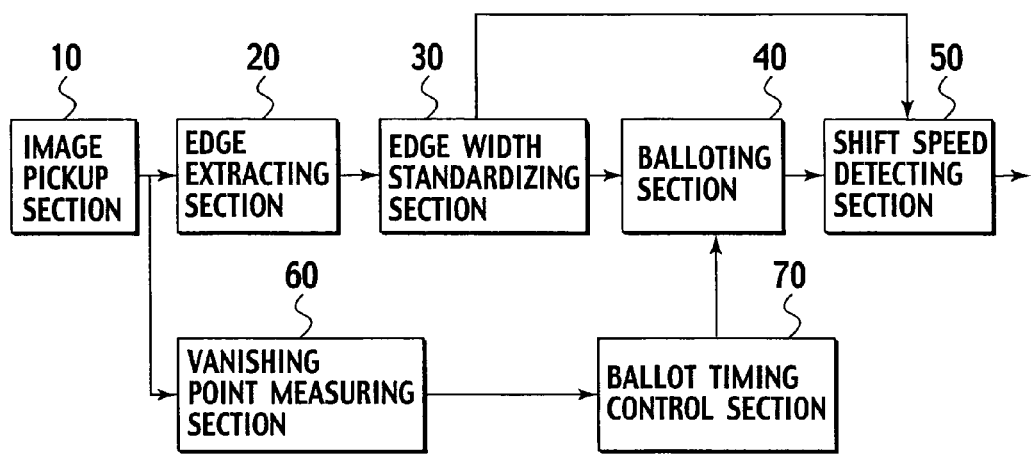
FIG. 20 is a structural view of a motion detection apparatus of a fourth embodiment according to the present invention.
Figure 21:
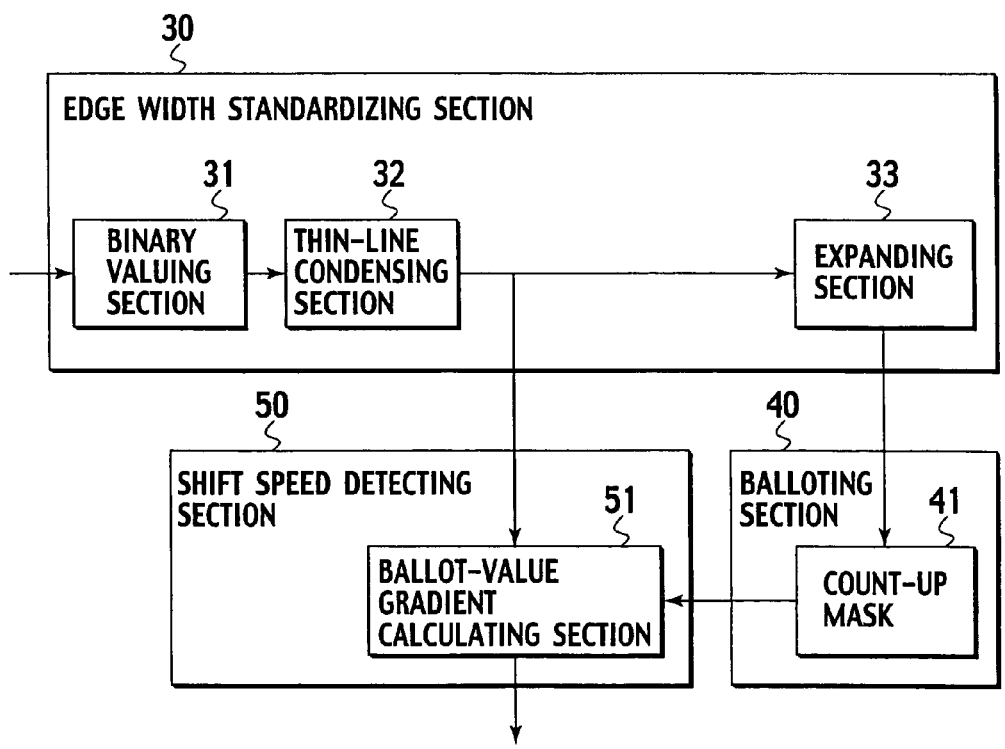
FIG. 21 is a detailed structural view showing an edge-width standardizing section, a balloting section and a speed direction detecting section shown in FIG. 20.

As shown in FIG. 20, the motion detection apparatus of the presently filed embodiment is comprised of the image pickup section 10, the edge extracting section 20, the edge-width standardizing section 30, the balloting section 40 and the shift speed detecting section 50. Further, as shown in FIG. 21, the edge-width standardizing section 30 is comprised of the binary valuing section 31, the thin-line condensing section 32 and the expanding section 33. Also, the balloting section 40 includes the count-up mask 41 and the shift speed detecting section 50 includes the balloting value gradient calculating section 51. Concrete structures and processing methods of the image pickup section 10, the edge extracting section 20, the edge-width standardizing section 30, the balloting section 40 and the shift speed detecting section 50 are similar to those of the first embodiment (or the second embodiment) and description is herein omitted.

In addition, the motion detection apparatus further includes, in addition to the component elements described above, a vanishing point measuring section 60 and a ballot timing control section 70.

The vanishing point measuring section 60 serves to obtain a vanishing point in a frame image clipped by the image pickup section 10. Here, the term "vanishing point" refers to a point at which lines, extending from road white lines on the frame image, are converged. The vanishing point measuring section 60 detects the vanishing point upon calculation of an occurring point from a flow vector in the frame image and calculation based on a steering angle of a handle and a yaw measured by a yaw rate sensor.

The ballot timing control section 70 serves to control a timing, at which the counting-up and resetting of the balloting section are executed, based on the vanishing point detected by the vanishing point measuring section 60. More particularly, the ballot timing control section 70 controls so as to allow the timing, at which the ballot value of the pixel areas, remote from a pixel position of the vanishing point in the frame image, is counted up and reset, to be shorter than that at which the ballot value of the pixel areas closer to the pixel position in the vanishing point in the frame image is counted up and reset.

Figure 22A:
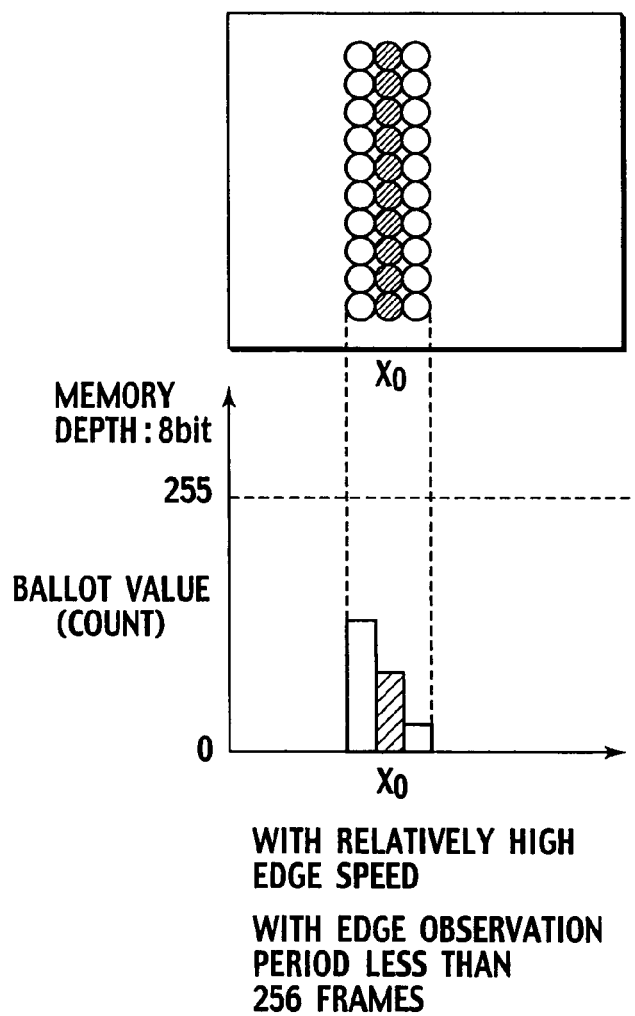
FIGS. 22A and 22B are views illustrating the relationship between a shift speed of an edge and a ballot value, with FIG. 22A showing a case in which the shift speed of the edge is relatively high and FIG. 22A showing a case in which the shift speed of the edge is relatively low.
Figure 22B:
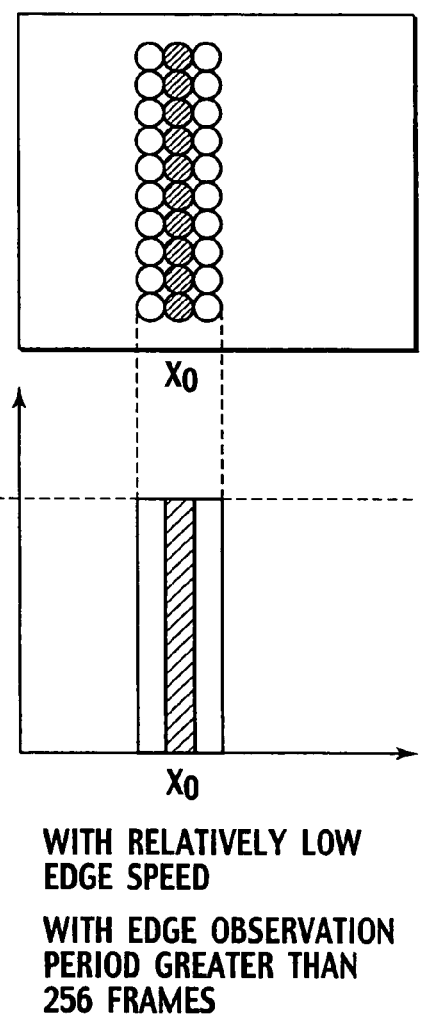

Before describing the operation to control the counting-up and resetting operations of the ballot value of the ballot timing control section 70, description is made of the reason why timings are controlled in such a way. FIGS. 22A and 22B are views for illustrating the relationships between the shift speed of the edge and a count value, with FIG. 22A showing a case in which the shift speed of the edge is relatively high and FIG. 22B showing a case in which the shift speed of the edge is relatively low.

The balloting section 40 serves to count up the ballot value of the respective pixels of the frame image and, with each pixel having an address in depth of 8 bits, the "ballot value" can be calculated to the maximum amount of "255". Here, as shown in FIG. 22A, if the shift speed of the edge is relatively high, the edge shifts by one pixel or several pixels for several frame images. Therefore, if the shift speed of the edge is relatively high, the ballot value takes a value that reflects the shift speed and the shift direction of the edge.

However, if the shift speed of the edge is relatively low, the edges are calculated at the same position for more than 256 times. In particular, when camera with a high frame rate (with a frame rate of 1000 fps) picks up images, a time interval, needed for picking up 256 sheets of images, is "0.256 sec" and a probability occurs wherein the edges are calculated on the same position for more than the time interval. Then, in such a case, the ballot value exceeds the value of "255" to overflow as shown in FIG. 22B. Therefore, this results in a difficulty in detecting an accurate shift speed and shift direction of the edge. Here, a phenomenon, in which no edge moves on the frame image, is liable to occur at the vanishing point. This is due to the fact that the motions per se of the object, becoming the target to be observed, and the background becomes small in the vicinity of the vanishing point.

Accordingly, the overflow is liable to occur in the vicinity of the vanishing point. It is conceived that one countermeasure to address the issue of such an overflow of the ballot value, arising from the influence of the vanishing point, is undertaken by increasing a bit depth of each pixel on the frame image. However, such a case results in an increase in a memory capacity with the resultant increase in cost.

Therefore, for the purpose of precluding the occurrence of the overflow of the ballot value in the vicinity of the vanishing point, where the motion on the frame image is slow, without causing such an increase in cost, it is required for the timing, at which the balloting section 40 counts up and initializes, to be controlled.

The ballot timing control section 70 controls a cycle for the ballot value to be counted up and reset based on a pixel position of the vanishing point on a frame image, measured by the vanishing point measuring section 60, and pixel areas on the frame image whose edges are detected. More particularly, the ballot timing control section 70 increases the cycle for the ballot value, in the pixel areas in the vicinity of the vanishing point, to be counted up and reset while decreasing the cycle for the ballot value, in the pixel areas remote from the vanishing point, to be counted up and reset.

Figure 23:
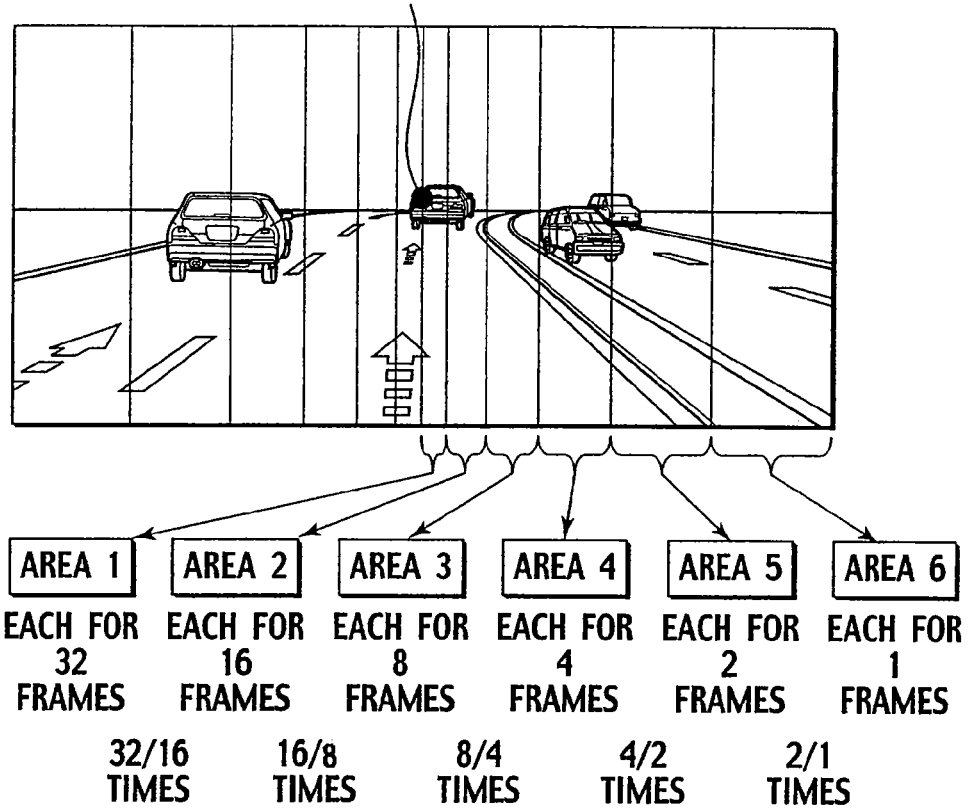
FIG. 23 is a view illustrating timing control at which the balloting section is counted up and initialized.

Here, referring to FIG. 23, description is made of an example in which a lateral shift speed of the edge is detected. FIG. 23 is a view for illustrating timing control for counting-up and resetting of the ballot value to be executed by the balloting section 40. As shown in FIG. 23, when a pixel position of a vanishing point is detected at a substantially center of a frame image, a shift speed of an edge in a lateral direction increases as the pixel areas get close to left and right ends of the image. With the presently filed embodiment, the pixel area is divided into six vertically extending areas (split areas 1 to 6) in an image between left and right ends of the image and the vanishing point and the cycles for the ballot values to be counted up and reset are shortened in an order from the split area 6 remotest from the vanishing point. With the presently filed embodiment, the cycles are configured such that the ballot values are counted up and reset every frame, every two flames, every four frames, every eight frames, every sixteen frames and every thirty-two frames in an order from the split area 6 remotest from the vanishing point. Therefore, in the pixel area (split area 6) at the left and right ends of the image, the ballot values are counted up and reset every one frame, but in the pixel area (split area 1) in the vicinity of the vanishing point, the ballot value are counted up and reset every thirty-two frames.

Thus, with the ballot timing control section 70 configured to set an increased cycle for counting up the ballot value in the split area closer to the vanishing point, the ballot value is prevented from overflowing.

Also, as set forth above, in cases where the pixel area on the frame image is split depending on a distance from the vanishing point to alter the timing, at which the ballot value is counted up and reset, for each split area, the ballot value differs for each split area. That is, in a case shown in FIG. 23, if the edges are detected in successive frames on the same pixel area on the frame image, even though the ballot value takes a value of "3" in the split area 4, the split area 6 has the ballot value with "12". In this case, when the edge transits across the adjacent split areas, the balloting section 40 corrects the ballot value in compliance with the cycle for each split area.

More particularly, in the case shown in FIG. 23, the ballot value is counted up and reset in the split area 4 every four frames and the ballot value is counted up and reset in the split area 5 every two frames.

Therefore, if the edge transits from the split area 4 to the split area 5, the balloting section 40 multiplies the counted value, which is measured, by $\frac{4}{2}$ times. On the other hand, if the edge transits from the split area 5 to the split area 4, the balloting section 40 multiplies the counted value by ⅔ times. Here, this magnification is determined based on the count cycles in the respective split areas. That is, if the edge transits from the split area a, whose ballot value is counted up every in-frames, to the split area b whose ballot value is counted up every n-frames, the ballot section 40 multiplies the count value by m/n times. With the presently filed embodiment, this enables the ballot value for each split area to be unified.

Figure 24:
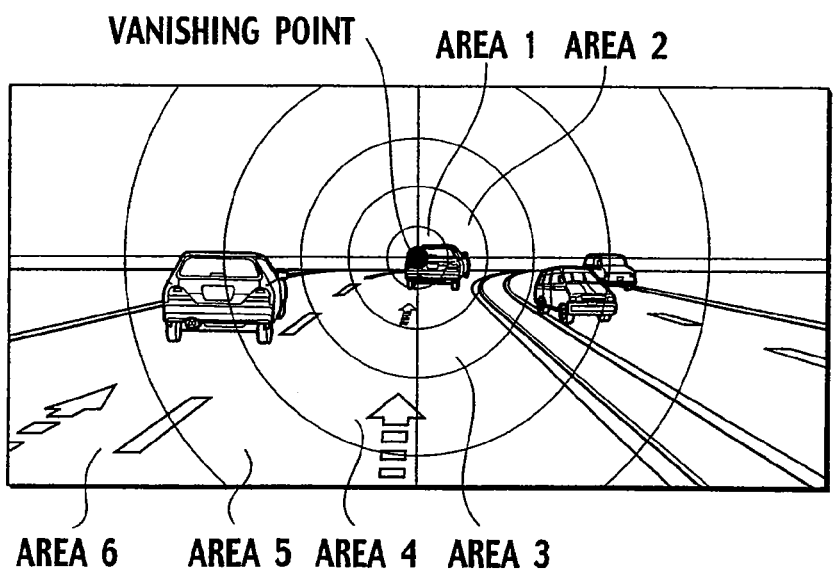
FIG. 24 is a view illustrating the other timing control at which the balloting section is counted up and initialized.

Also, while the pixel area, straddling between the image left and right ends and the vanishing point, has been split into six components, the pixel area may be divided into a pattern as shown in FIG. 24. FIG. 24 is a view illustrating a timing control to be executed by the balloting section 40 for counting up and resetting the ballot value.

In a case shown in FIG. 24, an entire pixel area on the frame image is divided in a polar coordinate system (circular coordinate system) with its origin at a pixel position of the vanishing point depending on a distance in a radial direction from the origin. That is, the ballot timing control section 70 controls the timing, at which the balloting section 40 counts up and resets the ballot value, in the polar coordinate system with the origin centered at the pixel position of the vanishing point detected by the vanishing point measuring section 60. Thus, by splitting the entire pixel area depending on the distance from the vanishing point, it becomes possible to set the accurate cycle for counting up and resetting the ballot value for each split area, enabling the shift speed of the edge to be accurately detected.

Next, the motion detection apparatus, with such a structure, and the motion detection method are described. FIGS. 25A and 25B are flowcharts illustrating the motion detection method to be executed by the motion detection apparatus of the presently filed embodiment, with FIG. 25A showing a main flow and FIG. 25B showing a sub flow.

First, as shown in FIG. 25A, in step S10, the frame image, clipped by the image pickup section 10, is inputted to the edge extracting section 20. Then, in step S20, the edge extracting section 20 extracts the edge from the inputted frame image.

In successive step S30, the edge-width standardizing section 30 standardizes an edge width of the extracted edge into a given pixel number along a shift direction of the edge. That is, first, the binary valuing section 31 executes the binary valuing operation on the edge. In succeeding step S40, the thin-line condensing section 32 condenses the edge into a thin line until the edge width of the binary valued edge is converted to a specified pixel number (one pixel). In subsequent step S50, the edge, whose edge width is condensed in the thin line to be unified, is expanded to a given pixel number.

Depending on the standardized edge that is standardized in such a way, the balloting operation of the ballot value is executed in step S60. That is, as shown in FIG. 25B, the vanishing point measuring section 60 detects the pixel position of the vanishing point in step S61. When this takes place, the vanishing point measuring section 60 detects the pixel position of the vanishing point based on the steering angle of the handle and vehicle information of the yaw rate sensor.

In next step S62, the ballot timing control section 70 calculates a distance from the pixel position of the vanishing point on the frame image, as shown in FIGS. 23 and 24, and in step S63, determines an update timing as mentioned above. In this moment, the ballot timing control section 70 determines the update timing to be short for the ballot value of the image area remote from the ballot value of the image area closer to the vanishing point depending on the distance from the pixel position of the vanishing point calculated in step S62.

Then, in step S64, the balloting section 40 discriminates whether or not the update timing comes out. That is, for the split area 3 shown in FIG. 23, it can be discriminated that the input image is the frame image at the eighth frame.

Here, if no update timing has come out (with "NO" in step S64), the operation proceeds to step S70 in FIG. 25A. On the contrary, if the update timing has come out (with "YES" in step S64), the operation is executed to count up the ballot value of the pixel area on which the standardized edge standardized in steps S30 to S50. Also, the balloting section 40 resets the ballot value of the pixel area whose edge is not present. Then, the operation proceeds to step S70 in FIG. 25A.

In step S70, the shift speed detecting section 50 detects the shift direction and shift speed of the edge based on the ballot value of each pixel that is counted up and reset in step S65. Here, the shift speed is obtained based on the ballot value and the shift direction is obtained based on the gradient of the ballot value as set forth above in connection with the first and second embodiments.

Then, the shift speed detecting section 50 outputs retrieved information to a lunge detection device.

As will be apparent from the foregoing description, the motion detection apparatus and motion detection method of the presently filed embodiment have, in addition to the advantageous effects of the first embodiment, a capability of controlling to shorten the timing for counting up and resetting the ballot value of the image area remoter from the ballot value of the image area closer to the pixel position of the vanishing point in the frame image for thereby preventing the ballot value of the edge from overflowing when the edges are continuously detected in the vicinity of the vanishing point with a resultant reduction in memory capacity.

Further, with the ballot timing control section 70 configured to control the timing for the counting up and resetting the ballot value based on the distance from the vanishing point, an accurate cycle for the counting up and resetting can be set, thereby enabling the shift speed of the edge to be accurately detected.

The entire contents of Japanese Patent Applications Laid-open No. P2004-278250 with a filing data of Sep. 24, 2004 and Laid-open P2004-279394 with a filing data of Sep. 27, 2004 are herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A motion detection apparatus for detecting a motion of an object, comprising:

an image pickup section picking up a motion image and successively clipping a time series of frame images;

a feature extracting section extracting a first feature area, representing a feature of the object, from a first frame image among the time series of frame images;

a feature area standardizing section standardizing a size of the first feature area to be set as a first standardized feature area;

a mask generating section setting an area on the first frame image, which is a complement of the first standardized feature area in the first frame image, as a first masked area;

a balloting section resetting a count value associated with each pixel when the relevant pixel is located on the first masked area, and incrementing the count value when the relevant pixel is located on a first on-masked area that is the first standardized feature area; and shift speed calculating section calculating a shift direction and shift speed of the first feature area based on a spatial gradient of the count values, accumulated for the time series of frame images, associated with the pixels located on the first standardized feature area, wherein the feature extracting section detects a corner edge component of the object as the first feature area.

2. A motion detection apparatus for detecting a motion of an object, comprising:

an image pickup section picking up a motion image and successively clipping a time series of frame images;

a feature extracting section extracting a first feature area, representing a feature of the object, from a first frame image among the time series of frame images;

a feature area standardizing section standardizing a size of the first feature area to be set as a first standardized feature area;

a mask generating section setting an area on the first frame image, which is a complement of the first standardized feature area in the first frame image, as a first masked area;

a balloting section resetting a count value associated with each pixel when the relevant pixel is located on the first masked area, and incrementing the count value when the relevant pixel is located on a first non-masked area that is the first standardized feature area;

a shift speed calculating section calculating a shift direction and shift speed of the first feature area based on a spatial gradient of the count values, accumulated for the time series of frame images, associated with the pixels located on the first standardized feature area; and a reset timing generating section that sets a reset timing at which the count values of the pixels located on the first non-masked area and a setting of the first masked area are reset, based on a positional relationship between the first standardized feature area and a second standardized feature area in which a size of a second feature area adjacent to the first feature area is standardized.

3. The motion detection apparatus according to claim 2, wherein the reset timing generating section generates the reset timing, when the non-masked area of the first standardized feature area and the non-masked area of the second standardized feature area overlap each other, and resets the count values of the pixels located on the first non-masked area and the setting of the first masked area.

4. A motion detection apparatus for detecting a motion of an object, comprising:

an image pickup section picking up a motion image and successively clipping a time series of frame images;

a feature extracting section extracting a first feature area, representing a feature of the object, from a first frame image among the time series of frame images;

a feature area standardizing section standardizing a size of the first feature area to be set as a first standardized feature area;

a mask generating section setting an area on the first frame image, which is a complement of the first standardized feature area in the first frame image, as a first masked area;

a balloting section resetting a count value associated with each pixel when the relevant pixel is located on the first masked area, and incrementing the count value when the relevant pixel is located on a first non-masked area that is the first standardized feature area; and a shift speed calculating section calculating a shift direction and shift speed of the first feature area based on a spatial gradient of the count values, accumulated for the time series of frame images, associated with the pixels located on the first standardized feature area, wherein the mask generating section sets an area, generated by a logical product between the first masked area in the first frame image, and an area, which is the complement of the first standardized feature area in the second frame image adjacent to the first frame image in time series, as a masked area of the first standardized feature area in the second frame image.

5. The motion detection apparatus according to claim 4 wherein the feature extracting section detects an edge component of the object as the first feature area.

6. The motion detection apparatus according to claim 4, wherein the feature extracting section detects a spatial feature vector of the object as the first feature area.

7. The motion detection apparatus according to claim 4, wherein the feature area standardizing section specifies a representative point from the first feature area to represent the first standardized feature area.

8. The motion detection apparatus according to claim 4 wherein the shift speed calculating section calculates a position of the first feature area based on the spatial gradient of the accumulated count values associated with the pixels located on the first standardized feature area and a minimal count value in the accumulated count values.

9. The motion detection apparatus according to claim 4, wherein the feature area standardizing section specifies a size of standardization depending on the shift speed of the first feature area.

10. The motion detection apparatus according to claim 4, further comprising:

a vanishing point detecting section detecting a vanishing point on the first frame image; and a ballot timing control section controlling a timing at which the balloting section increments the count values of the pixels located on the first non-masked area and a timing at which the balloting section resets the count values of the pixels located on the first masked area, based on location of the vanishing point on the first frame image, wherein the ballot timing control section allows a timing at which the count values of the pixels located on an area on the first non-masked area remote from the vanishing point are incremented, to be shorter than that at which the count values of the pixels located on an area on the first non-masked area closer to the vanishing point are incremented, and allows a timing at which the counted values of the pixels located on an area on the first masked area remote from the vanishing point are reset, to be shorter than that at which the counted values of the pixels located on an area on the first masked area closer to the vanishing point are reset.

11. The motion detection apparatus according to claim 10, wherein the timing control section is configured to set a polar coordinate system with an origin at the vanishing point to control the timing at which the balloting section increments the count values of the pixels located on the first non-masked area and the timing at which the balloting section resets the count values of the pixels located on the first masked area, in the polar coordinate system.

12. A motion detection method for detecting a motion of an object, comprising:

an image picking-up step for picking up a motion image and successively clipping a time series of frame images;

a feature extracting step for extracting, by a feature extracting section, a first feature area representing a feature of the object, from a first frame image among the time series of frame images;

a feature area standardizing step for standardizing a size of the first feature area to be set as a first standardized feature area;

a mask generating step for setting an area on the first frame image, which is a complement of the first standardized feature area in the first frame image, as a first masked area;

a balloting step for resetting a count value associated with each pixel when the relevant pixel is located on the first masked area, and incrementing the count value when the relevant pixel is located on a first non-masked area that is the first standardized feature area; and a shift speed calculating step for calculating a shift direction and shift speed of the first feature area based on a spatial gradient of the count values, accumulated for the time series of frame images, associated with the pixels located on the first standardized feature area, wherein the feature extracting step detects a corner edge component of the object as the first feature area.

13. A motion detection method for detecting a motion of an object, comprising:

an image picking-up step for picking up a motion image and successively clipping a time series of frame images;

a feature extracting step for extracting, by a feature extracting section, a first feature area, representing a feature of the object, from a first frame image among the time series of frame images;

a feature area standardizing step for standardizing a size of the first feature area to be set as a first standardized feature area;

a mask generating step for setting an area on the first frame image, which is a complement of the first standardized feature area in the first frame image, as a first masked area;

a balloting step for resetting a count value associated with each pixel when the relevant pixel is located on the first masked area, and incrementing the count value when the relevant pixel is located on a first non-masked area that is the first standardized feature area;

a shift speed calculating step for calculating a shift direction and shift speed the first feature area based on a spatial gradient of the count values, accumulated for the time series of frame images, associated with the pixels located on the first standardized feature area; and a reset timing generating step for setting a reset timing at which the count values of the pixels located on the first non-masked area and a setting of the first masked area are reset, based on a positional relationship between the first standardized feature area and a second standardized feature area in which a size of a second feature area adjacent to the first feature area is standardized.

14. The motion detection method according to claim 13, wherein the reset timing generating steps generates the reset timing, when the non-masked area of the first standardized feature area and the non-masked area of the second standardized feature area overlap each other, and resets the count values of the pixels located on the first non-masked area and the setting of the first masked area to be executed by the balloting step.

15. A motion detection method for detecting a motion of an object, comprising:

an image picking-up step for picking up a motion image and successively clipping a time series of frame images;

a feature extracting step for extracting, by a feature extracting section, a first feature area, representing a feature of the object, from a first frame image among the time series of frame images;

a feature area standardizing step for standardizing a size of the first feature area to be set as a first standardized feature area;

a mask generating step for setting an area on the first frame image, which is a complement of the first standardized feature area in the first frame image, as a first masked area;

a balloting step for resetting a count value associated with each pixel when the relevant pixel is located on the first masked area, and incrementing the count value when the relevant pixel it located on a first non-masked area that is the first standardized feature area; and a shift speed calculating step for calculating a shift direction and shift speed of the first feature area based on a spatial gradient of the count values, accumulated for the time series of frame images, associated with the pixels located on the first standardized feature area, wherein the mask generating step sets an area, generated by a logical product between the first masked area in the first frame image, and an area, which is the complement of the first standardized feature area in the second frame image adjacent to the first frame image in time series, as a masked area of the first standardized feature area in the second frame image.

16. The motion detection method according to claim 15 wherein the feature extracting step detects an edge component of the object as the first feature are a.

17. The motion detection method according to claim 15, wherein the feature extracting step detects a spatial feature vector of the object as the first feature area.

18. The motion detection method according to claim 15, wherein the feature area standardizing step specifies a representative point from the first feature area to represent the first standardized feature area.

19. The motion detection method according to claim 15, wherein the shift speed calculating step calculates a position of the first feature area based on the spatial gradient of the accumulated count values associated with the pixels located on the first standardized feature area and a minimal count value in the accumulated count values.

20. The motion detection method according to claim 15, wherein the feature area standardizing step specifies a size of standardization depending on the shift speed of the first feature area.

21. The motion detection method according to claim 15, further comprising:

a vanishing point detecting step detecting a vanishing point on the first frame image; and a ballot timing control step controlling a timing at which the balloting step increments the count values of the pixels located on the first non-masked area and resets the count values of the pixels located on the first masked area, based on location of the vanishing point on the first frame image, detected in the vanishing point detecting step, wherein the ballot timing control step allows a timing at which the count value of the pixel located on an area remote from the vanishing point detected by the vanishing point detecting step is incremented and reset, to be shorter than that at which the count value of the pixel located on the area closer to the vanishing point is incremented and reset.

22. A motion detection apparatus for detecting a motion of an object, comprising:

image pickup means for picking up a motion image and consecutively clipping a time series of frame images;

feature extracting means for extracting a first feature area, representing a feature of the object, from a first frame image among the time series of frame images;

feature area standardizing means for standardizing a size of the first feature area to be set as a first standardized feature area;

mask generating means for setting an area on the first frame image, which is a complement of the first standardized feature area in the first frame image, as a first masked area;

balloting means for resetting a count value associated with each pixel when the relevant pixel is located on the first masked area, and incrementing the count value when the relevant pixel is located on a first non-masked area that is the first standardized feature area; and shift speed calculating means for calculating a shift direction and shift speed of the first feature area based on a spatial gradient of the count values, accumulated for the time series of frame images, associated with the pixels located on the first standardized feature area, wherein the mask generating means sets an area, generated by a logical product between the first masked area in the first frame image, and an area, which is the complement of the first standardized feature area in the second frame image adjacent to the first frame image in time series, as a masked area of the first standardized feature area in the second frame image.

* * * * *